United States Patent
Huber et al.

(10) Patent No.: US 7,921,499 B2
(45) Date of Patent: Apr. 12, 2011

(54) METHOD AND DEVICE FOR PRODUCING A TOOTHBRUSH BY THE TWO-COMPONENT OR MULTI-COMPONENT INJECTION-MOLDING PROCESS

(75) Inventors: Beat Huber, Buron (CH); Peter Gross, Sempach (CH)

(73) Assignee: Trisa Holding AG, Triengen (CH)

( * ) Notice: Subject to any disclaimer, the term of this patent is extended or adjusted under 35 U.S.C. 154(b) by 1009 days.

(21) Appl. No.: 11/632,042

(22) PCT Filed: Jul. 12, 2005

(86) PCT No.: PCT/CH2005/000398
§ 371 (c)(1),
(2), (4) Date: Feb. 2, 2007

(87) PCT Pub. No.: WO2006/005216
PCT Pub. Date: Jan. 19, 2006

(65) Prior Publication Data
US 2008/0315668 A1  Dec. 25, 2008

(30) Foreign Application Priority Data

Jul. 12, 2004  (CH) ...................................... 1179/04

(51) Int. Cl.
*A46B 9/04* (2006.01)
*A46B 3/04* (2006.01)
(52) U.S. Cl. ............. 15/167.1; 15/186; 15/187; 15/188; 15/190; 15/192; 15/193; 300/8; 300/21
(58) Field of Classification Search ................ 15/167.1, 15/186, 187, 188, 190, 192, 193; 300/8, 300/21
See application file for complete search history.

(56) References Cited

U.S. PATENT DOCUMENTS

| | | | |
|---|---|---|---|
| 5,839,149 A | 11/1998 | Scheier et al. | |
| 6,161,245 A | 12/2000 | Weihrauch | |
| 6,402,494 B1 * | 6/2002 | Lanvers | 425/116 |
| 2003/0131433 A1 | 7/2003 | Pavone | |
| 2004/0010876 A1 * | 1/2004 | Kraemer | 15/143.1 |
| 2004/0117934 A1 * | 6/2004 | Pfenniger et al. | 15/167.1 |
| 2005/0039279 A1 | 2/2005 | Koeth et al. | |

FOREIGN PATENT DOCUMENTS

| | | |
|---|---|---|
| DE | 200 13862 U1 | 12/2000 |
| EP | 0 923 326 B1 | 6/2003 |
| EP | 1 486 137 A2 | 12/2004 |
| JP | A 2001-190333 | 7/2001 |
| WO | WO 98/27847 | 7/1998 |
| WO | WO 98/43514 | 10/1998 |
| WO | WO 99/16604 | 4/1999 |
| WO | WO 00/28854 | 5/2000 |
| WO | WO 03/030680 A1 | 4/2003 |
| WO | WO 2004/080238 A1 | 9/2004 |

* cited by examiner (Continued)

*Primary Examiner* — Robert Scruggs
(74) *Attorney, Agent, or Firm* — Oliff & Berridge, PLC

(57) ABSTRACT

The invention relates to a method and a device for producing a toothbrush (50) or part thereof by the two-component or multi-component injection-molding process. To produce in the brush body segments (20) that are isolated from the rest of the brush body, a mold (10) which comprises three hollow regions (12, 14, 16) is used. Two of these hollow regions (12, 14) that are separate from one another serve for producing the segments (12) and the other regions (18) of the toothbrush (50) from a first component (38). A third hollow region (16) serves for distributing material to the segments (20) that are isolated from one another and from the other regions (18), or the corresponding hollow region (14). The material (22) remaining behind there is removed and sent for disposal. In a further step, connecting elements (42) between the segments (20) and/or the other regions (18) are injection-molded from a second component (39).

31 Claims, 12 Drawing Sheets

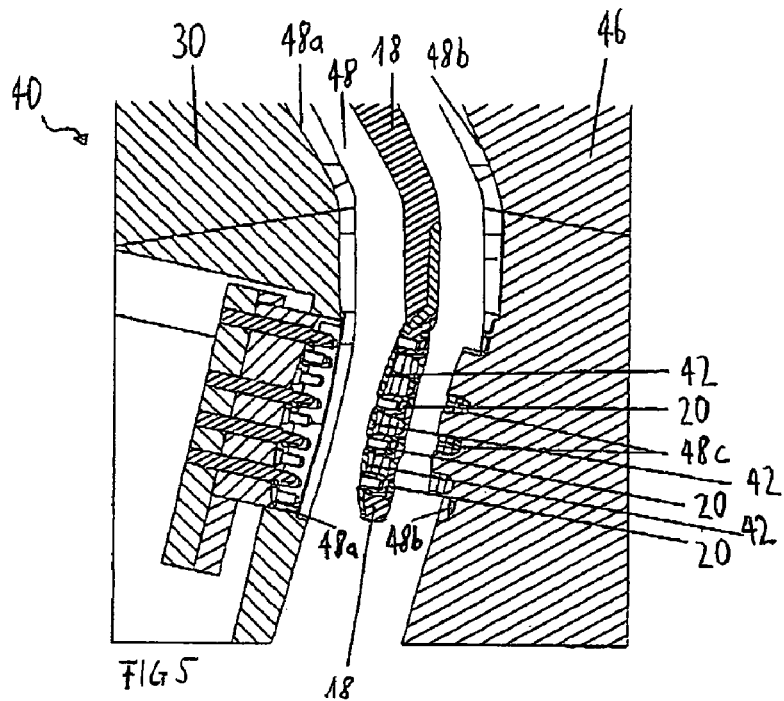
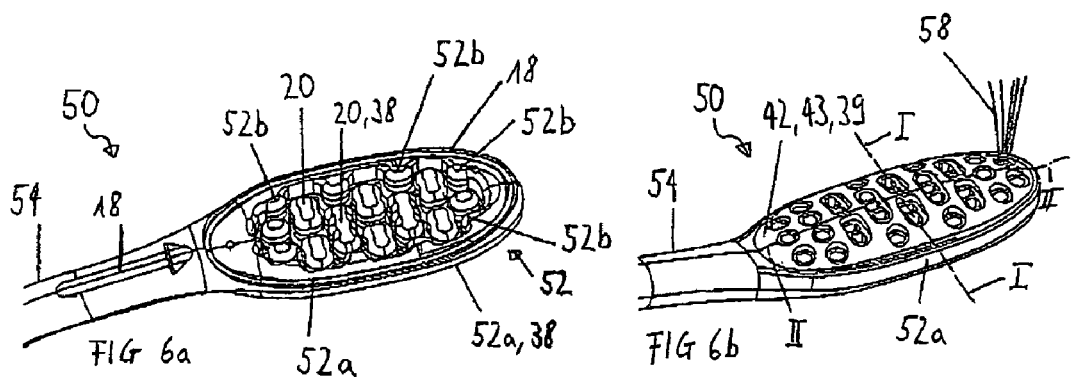
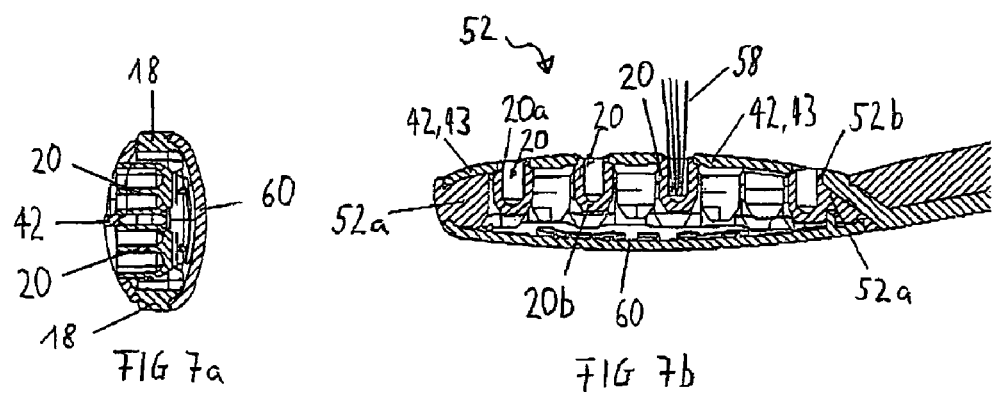

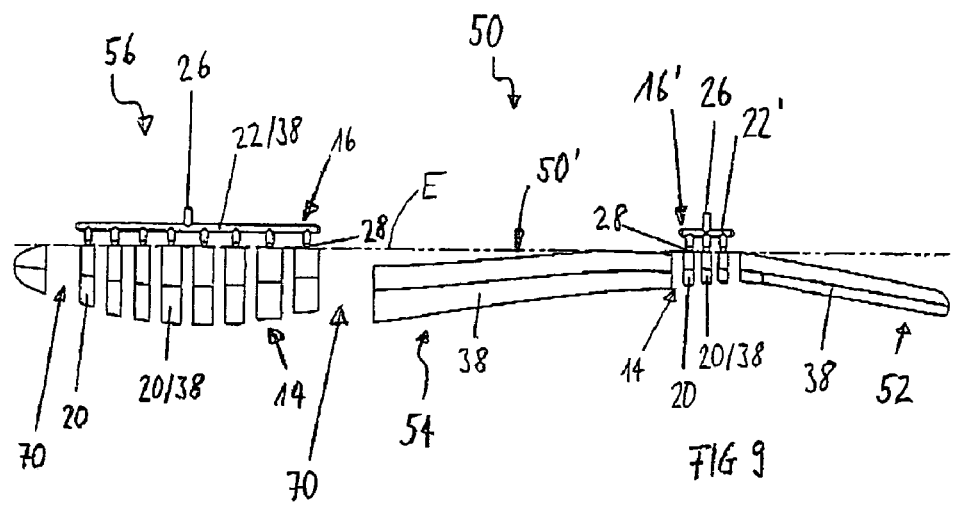
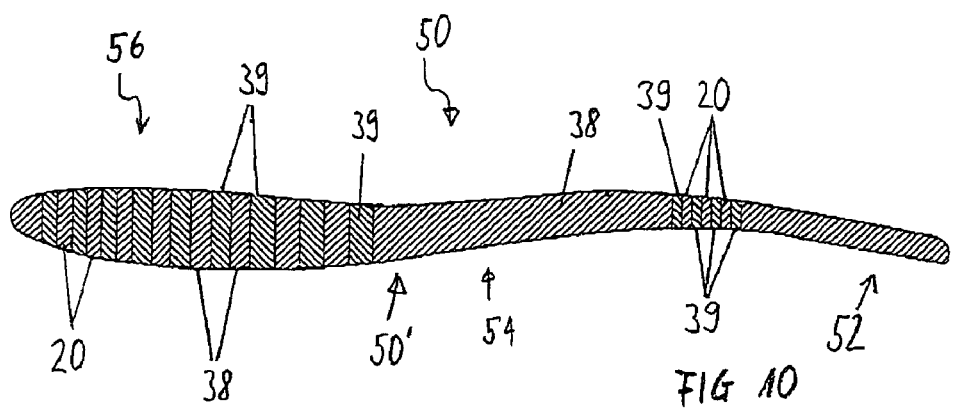

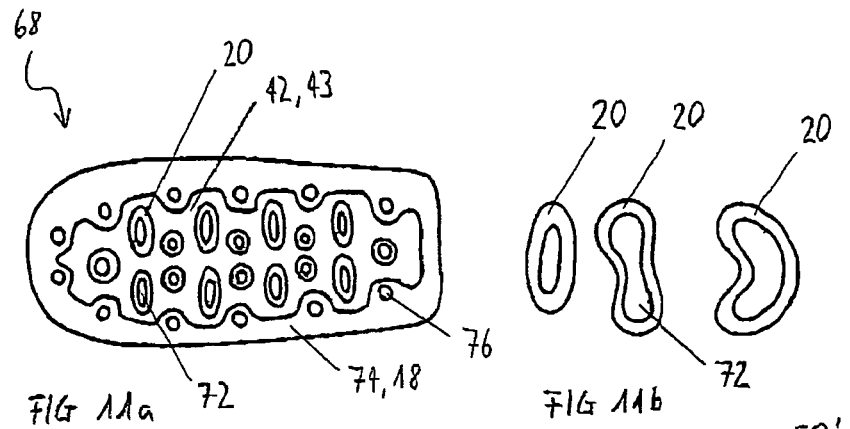
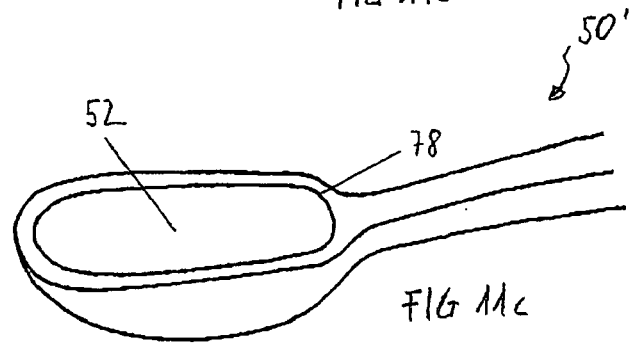
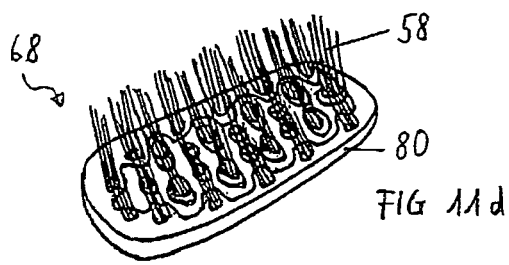
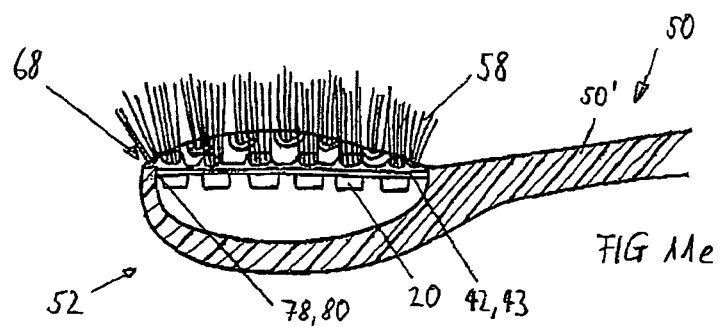

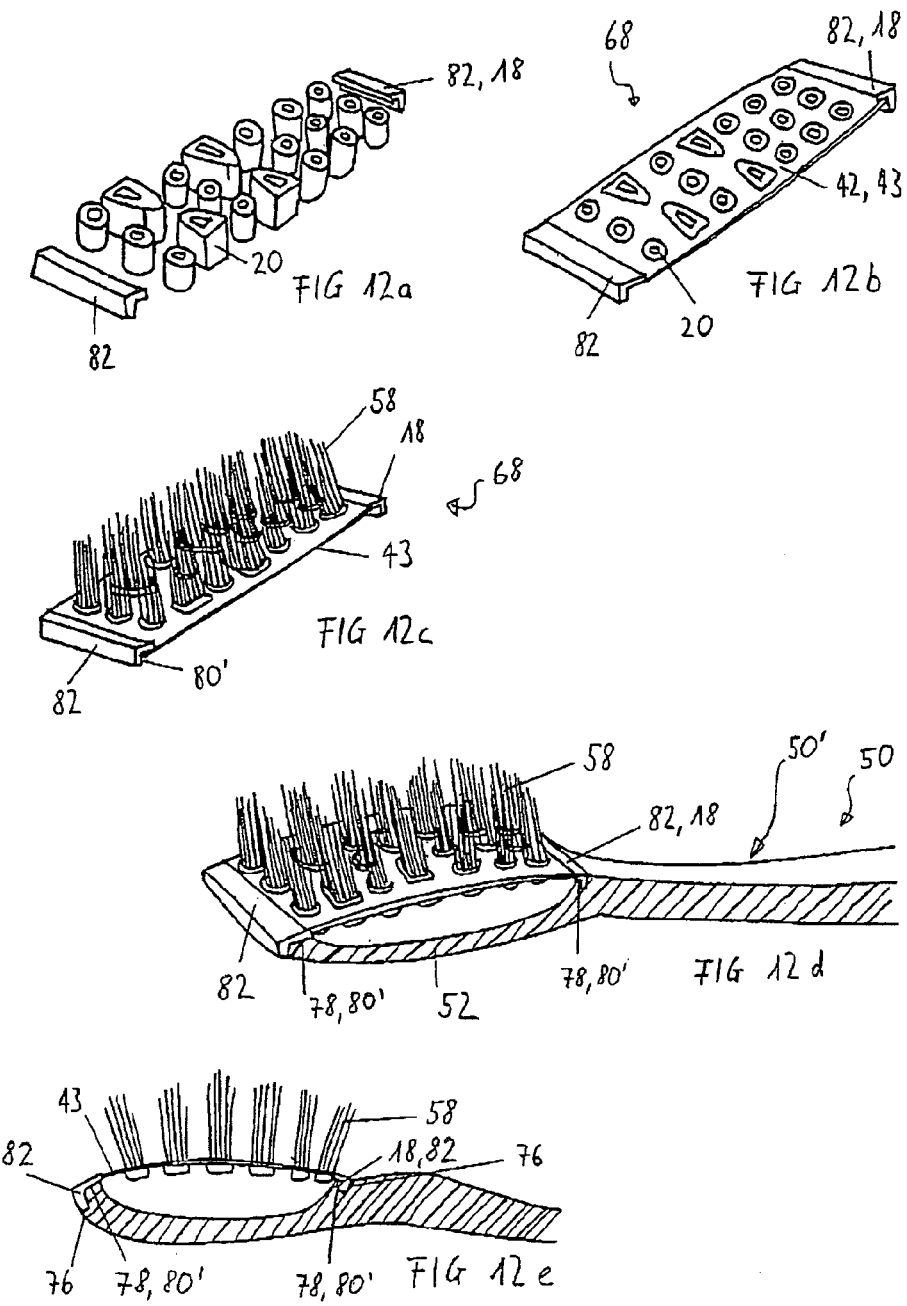

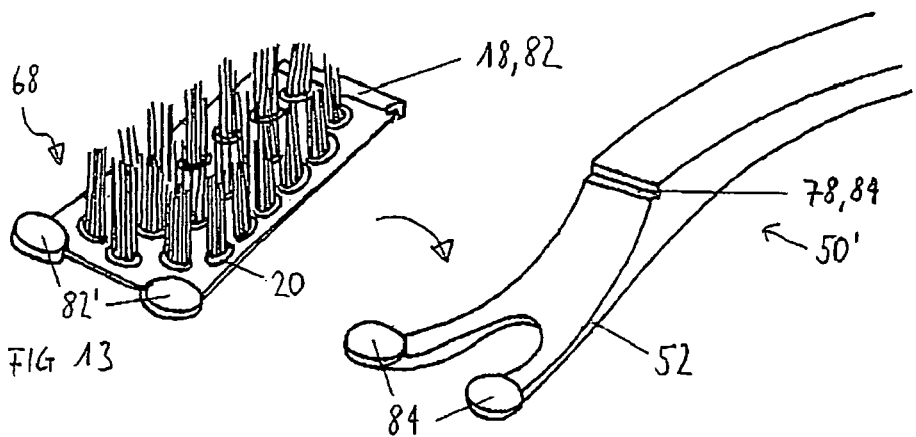
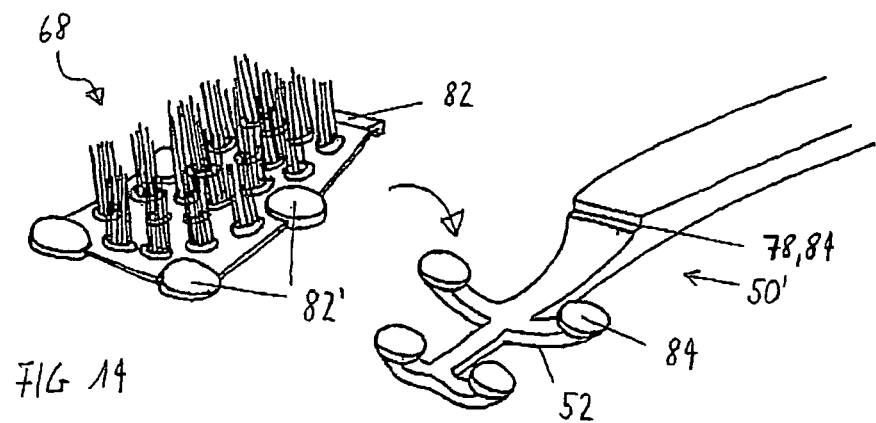
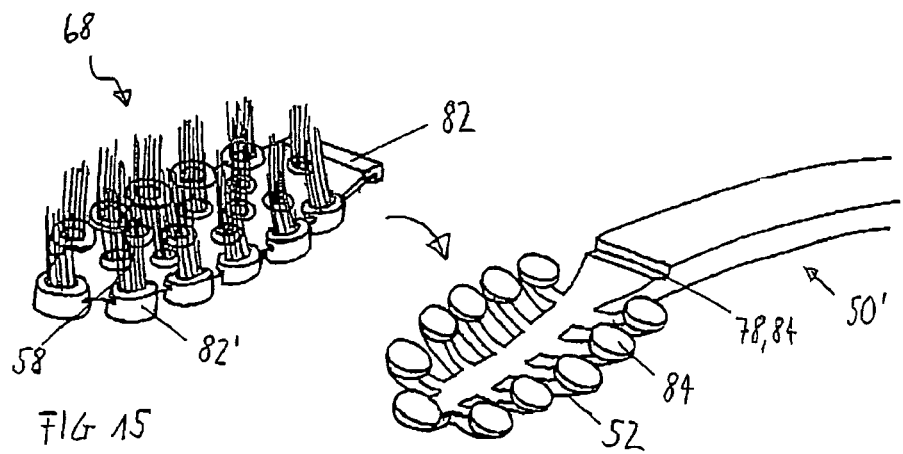

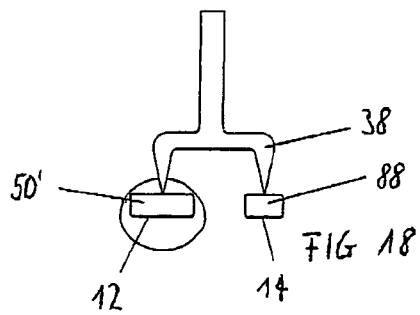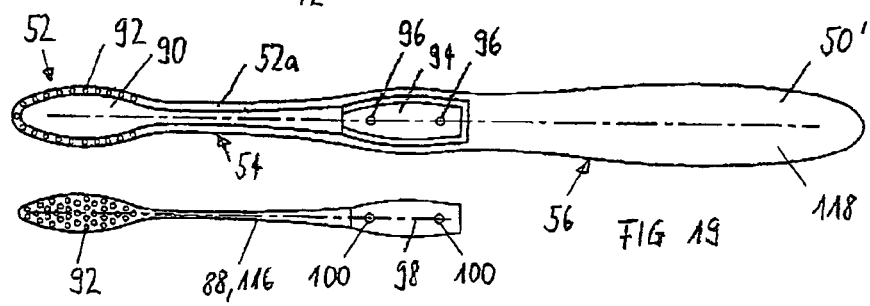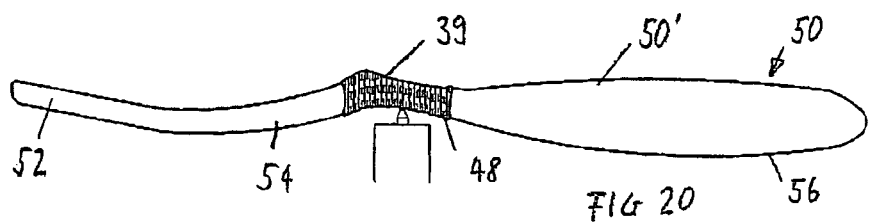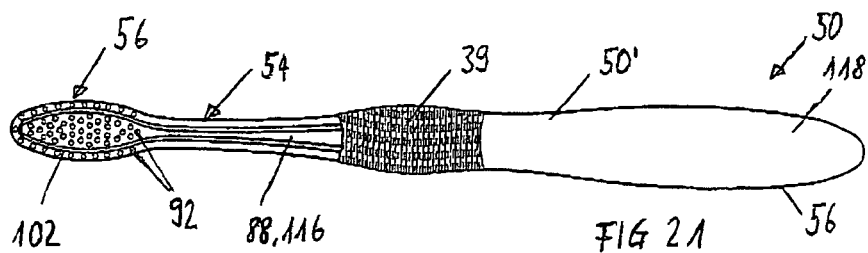

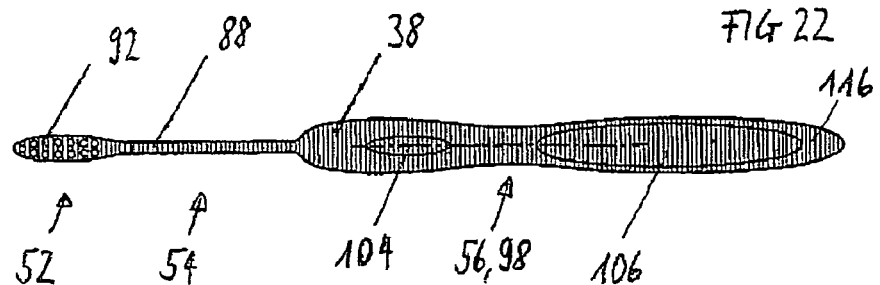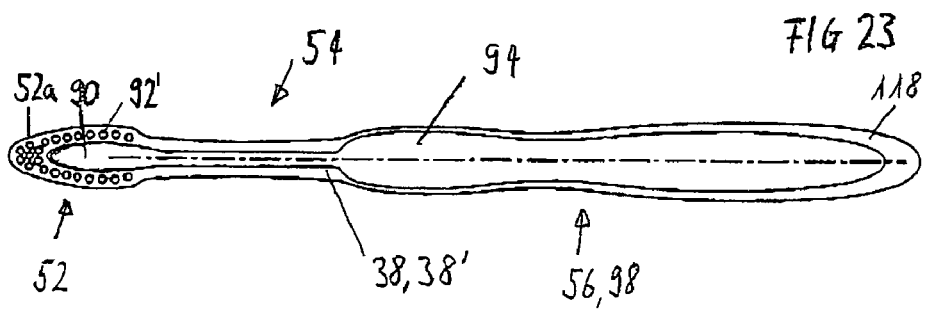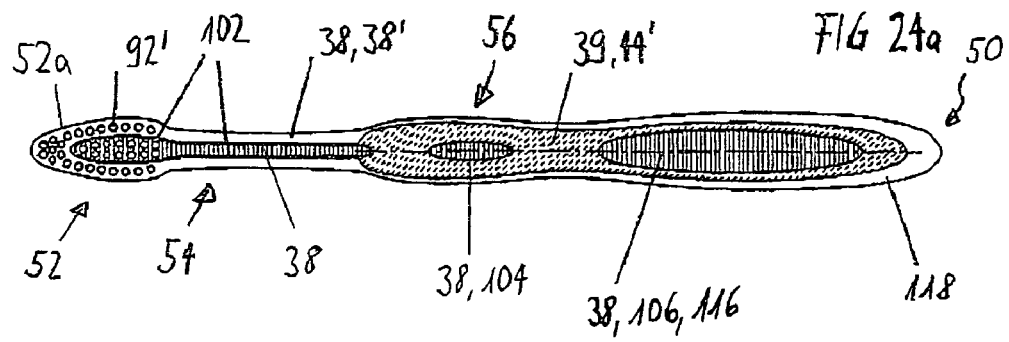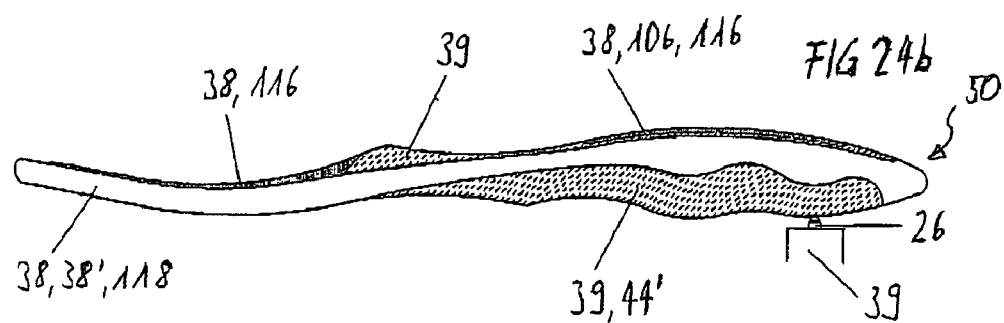

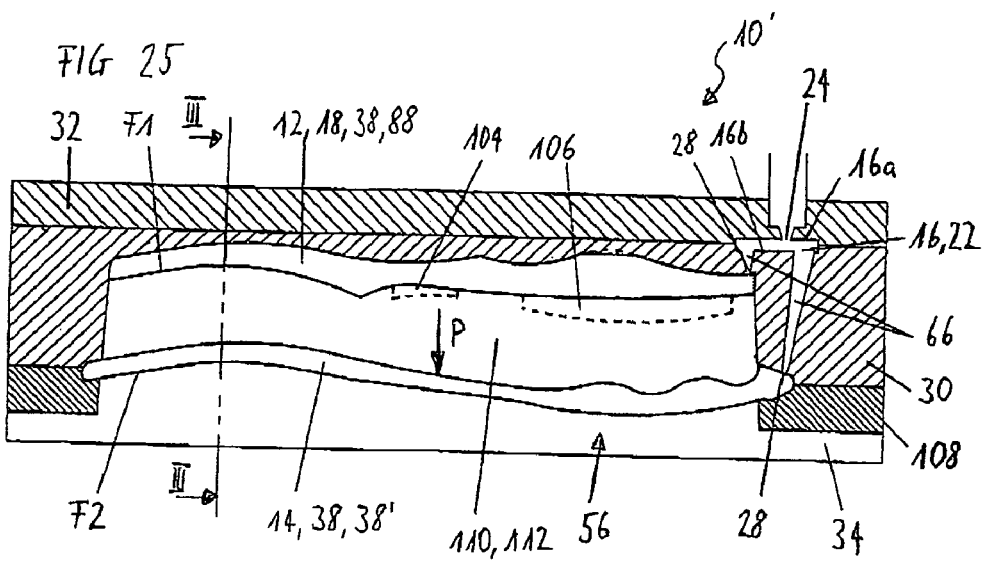
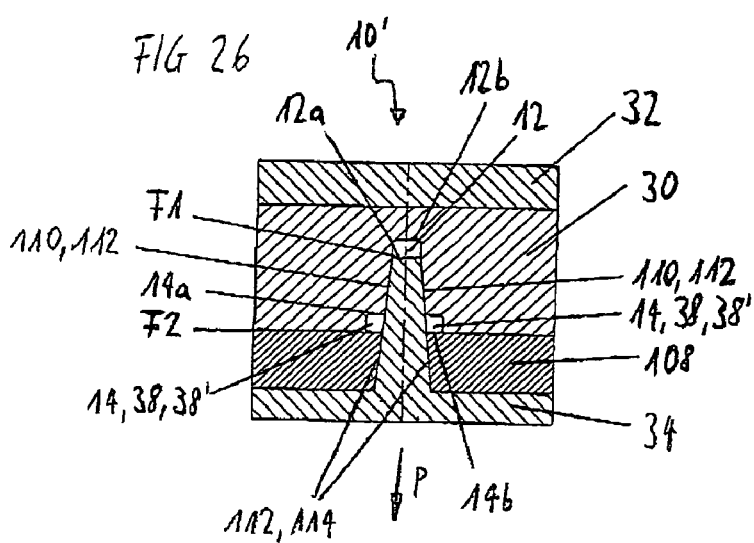

METHOD AND DEVICE FOR PRODUCING A TOOTHBRUSH BY THE TWO-COMPONENT OR MULTI-COMPONENT INJECTION-MOLDING PROCESS

The invention relates to a method and a device for producing a toothbrush or part thereof by the two-component or multi-component injection-molding process.

The production of toothbrushes by the two-component injection-molding process is known per se and is used in particular in the case of high-quality toothbrushes, to allow high requirements for function and design to be met. Widely encountered for example are toothbrushes comprising a body made up of a hard form-determining component, molded onto which are the additional flexible functional elements, for example a damping region in the neck region, cleaning elements in the head region or a gripping zone in the handle region. The use of different hard materials makes it possible for example to design the brush in two or more colors and/or to choose different grades of material for the different regions of the brush. Toothbrushes of this type are produced in a two-component injection-molding tool, in which all regions of the first component are first molded in a first mold from a first injection point and then all regions of the second component are molded in a second mold from further injection points. In the case of the known methods, the regions of the first component are completely contiguous, which facilitates both the actual injection-molding and the further handling of the blank, in particular the transfer into the second mold cavity. A disadvantage of this is that it imposes limits on the forming of functional regions. For example, in the case of known toothbrushes with a damping region in the neck, a meandering "framework" of hard material is always present in the neck, connecting the handle region and the head region to one another.

EP-A 0 923 326 or WO 98/27847 disclose toothbrushes which comprise two components, a hard component and a soft component, the first component having regions which are completely separate from the other regions of the first component and only connected to them by means of the second component. These isolated regions are referred to hereafter as "segments". "Other regions" refers to those regions of the body that comprise the first component, are connected to one another and are not "segments".

In the case of the toothbrush according to EP-A 0 923 326, individual bristle clusters are embedded in sleeve-like segments of a hard material. The segments in turn are embedded in a flexible material, which forms the head part of the brush. The handle region and the neck region in turn consist of the hard material. The production method is not specified.

In the case of the toothbrush according to WO 98/27847, the head region comprises a number of segments, for example three or five, of a hard component, which respectively carry a plurality of bristle clusters. The intermediate spaces between the segments are filled with a soft material. Here, too, the production method is not specified.

The injection-molding particularly of small isolated structures from a number of injection points is problematical for spatial reasons. WO 99/16604 discloses a method in which a toothbrush with isolated segments used for securing bristle clusters is created from a single injection point. A first mold is used for production, a mold which has interconnected cavities for forming both the segments and the other regions. The segments are separated from one another by movable mold cores, but not completely. This is so because the mold cores have clearances, through which the liquid material can flow from one part-cavity into the neighboring part-cavity. After solidifying, web portions which connect the segments to one another and to the other regions are formed in these clearances. Before the injection-molding of the second component, the mold cores are pulled out and the web portions are consequently sheared off. Here it is problematical that the first component is distributed among the multiplicity of segments, since the material must in this case flow equally through a number of narrow clearances in the mold cores. Furthermore, although the connection between two segments is interrupted by the pulling out of the mold cores, full mobility of the segments in relation to one another is not produced. The remains of the web portions, which are only sheared off but not removed, may impair the movement of the segments in an undefinable way. The injection-molding tool is also relatively complicated because of the movable mold cores. Because of the mold cores, there is a certain minimum distance between the segments.

The invention is therefore based on the object of providing a method for producing a toothbrush or part thereof by the two-component or multi-component injection-molding process by which a toothbrush or part thereof can be produced with at least one segment in a simple way with great freedom of design with respect to the dimensions and position of the segment. Furthermore, a device for carrying out the method and a toothbrush with advantageous properties are to be provided.

The object is achieved by a method wan tne reatures or ins ciwhh,.

In a variant of the invention, a large part of the brush body, for example the entire form-determining part, is produced from the first component, and the segments are isolated therefrom in the head region of the toothbrush. The brush handle region and neck region and any parts connected thereto in the head region are then to be identified as the "other regions" of the toothbrush. In another variant of the invention, only part of the toothbrush, in particular a carrier element for bristles that is later to be connected to a separately produced brush body, is produced, in that segments and other regions are formed from the first component and subsequently connected by means of the second component. The other regions are in this case for example those locations at which the carrier element is connected to the brush body, and the segments mainly serve, as in the case of the first variant, for anchoring the cleaning elements, for example bristles. The parts serving for anchoring the cleaning elements are referred to hereafter in connection with the carrier element as "segments" and the parts assigned to the brush body are referred to as "other regions"; however, this assignment is not obligatory.

The bristles may be attached by conventional tufting, by the Anchor Free Tufting (AFT) method or by the In Mold Tufting (IMT) method. In conventional tufting, the segments preferably form sleeve-shaped receptacles, into which the anchor plates are punched after the injection of the two components. In the AFT method, the segments preferably have continuous holes, through which bristles are led, likewise after the injection of the two components, and are melted at their rear ends for connection to the carrier element. In the IMT method, the bristles are molded into the segments during the injection of the first component or are connected to them during the injection of the second component.

The carrier element is undetachably or detachably connected to the brush body, the latter for example for the production of an exchangeable-head toothbrush. Because of the good accessibility to the rear side, separately produced carrier elements are suitable in particular for providing bristles by means of the AFT method, but conventional tufting is also possible.

In an advantageous development of the invention, a first mold which has at least three hollow regions is used for producing the first component. Two hollow regions that are completely separate from one another correspond to the segments and the other regions of the brush body, respectively. A third hollow region serves the purpose of distributing the liquid first component fed to it to the second hollow region, corresponding to the segments. If there are a number of segments, the second hollow region comprises a corresponding number of subregions, which are in connection with one another exclusively via the third hollow region. The cross section of the connecting locations is preferably so small that the material remaining behind in the third hollow region (sprue and runner system) can be easily detached, for example by moving away the corresponding part-mold. This material is subsequently sent for disposal, preferably recycled. Therefore, by contrast with the use of a number of injection points, the third hollow region makes it possible for material to be distributed from one injection point also to structures that are many times smaller in relation to the brush body. It is consequently possible for example to produce fine sleeves that are isolated from one another for securing bristle clusters. The segments are completely separate from one another after removal of the material from the third hollow region, and can therefore also move with respect to one another without impairment after being encapsulated with the second component.

In principle, the hollow regions of the entire first mold may be supplied through a single injection point, if there is a connection between the first hollow region and the third hollow region. It is preferred that the first and third hollow regions are respectively supplied from at least one injection point of their own.

Depending on the number and position of the segments, the third hollow region may also be subdivided into subregions that are separate from one another, which are supplied by one injection point in each case.

In an advantageous development of the method, the spatial position of the segments in relation to one another and/or to the other regions is changed before the second component is injected. This is possible without any problem on account of the complete separation of the segments from one another and from the other regions. The segments may also be arranged such that they are touching one another and/or the other regions and/or are engaging/mounted in one another before the injection of the second component.

The first component is preferably a hard component and the second component a hard or soft component. Styrene-acrylonitrile (SAN), polyethylene terephthalate (PET), polyethylene (PE), polymethylmethacrylate (PMMA), acrylobutadiene styrene (ABS) or polypropylene (PP) is used for example as the hard component. A rubber-elastic material, preferably a thermoplastic elastomer (TPE), or for example polyurethane (PU), is used as the soft component. The hard-hard combination of materials, for example the combination of a transparent hard material with an opaque hard material and/or a hard material of different colors, is considered to be possible. The hard-soft combination is preferred however for the production of flexible connecting elements between the segments. The injection of further components is likewise possible. These are preferably further soft components, which are injection-molded onto the segments or onto the other regions.

The method according to the invention is used with preference to produce a toothbrush which has a plurality of segments in the head region. In the head region, a membrane of the second component, in which the segments are embedded, is mounted as a connecting element between the segments and the remaining body. The connection of the membrane to the brush body may be direct or obtained by being embedded in a carrier element which is connected to a separately produced brush body. The segments are with preference in the form of sleeves or cups and can respectively hold one or more bristle clusters attached conventionally or by the AFT method. The membrane provides particularly flexible mounting of the bristles.

In particular in the case of a flexible carrier element which is provided with bristles by the AFT method, in particular one produced according to the invention, there is the problem that the bristle melt does not adequately adhere to the carrier element. In this respect, it is proposed to treat the bristles or the carrier element before the melting of the bristle ends in such a way that increased adhesion between the carrier element and the bristles is produced by the melting.

Examples of the invention are described below and are represented in the drawings, in which, purely schematically:

FIG. 5 shows a sectional view according to FIG. 4 after the separation of the two part-molds;

FIGS. 6a, 6b, 7a, 7b show various views of a brush head produced by the method according to the invention;

FIGS. 9, 10 show views of a further toothbrush after the injection of the first component and second component, respectively;

FIGS. 11-15 show examples of toothbrushes with a carrier element, separately produced by the method according to the invention, for bristles with a membrane in various views;

FIG. 18 shows in a greatly simplified form a first injection-molding cycle in which two parts of a toothbrush are produced;

FIG. 19 shows in a plan view the two parts produced in the first injection-molding cycle;

FIG. 20 shows the encapsulation of the joined-together parts according to FIG. 19 by means of a soft component;

FIG. 21 shows in plan view the toothbrush without bristles, produced from the parts according to FIG. 19 by the method according to FIGS. 18 and 20;

FIG. 22 shows in plan view a first part produced by injection-molding;

FIG. 23 shows in plan view a second part produced by injection-molding;

FIG. 24a shows in plan view a view of a further toothbrush with the parts that are shown in FIGS. 22 and 23, which are connected to one another by means of a further component, in particular a soft component;

FIG. 24b shows in side view the toothbrush that is shown in FIG. 24a;

FIG. 25 shows a longitudinal sectional view of a further injection mold with two hollow regions for producing the two toothbrush parts that are shown in FIGS. 22 and 23; and FIG. 26 shows a cross-sectional view of the injection mold that is shown in FIG. 25 through the plane III-III.

Figure 8:
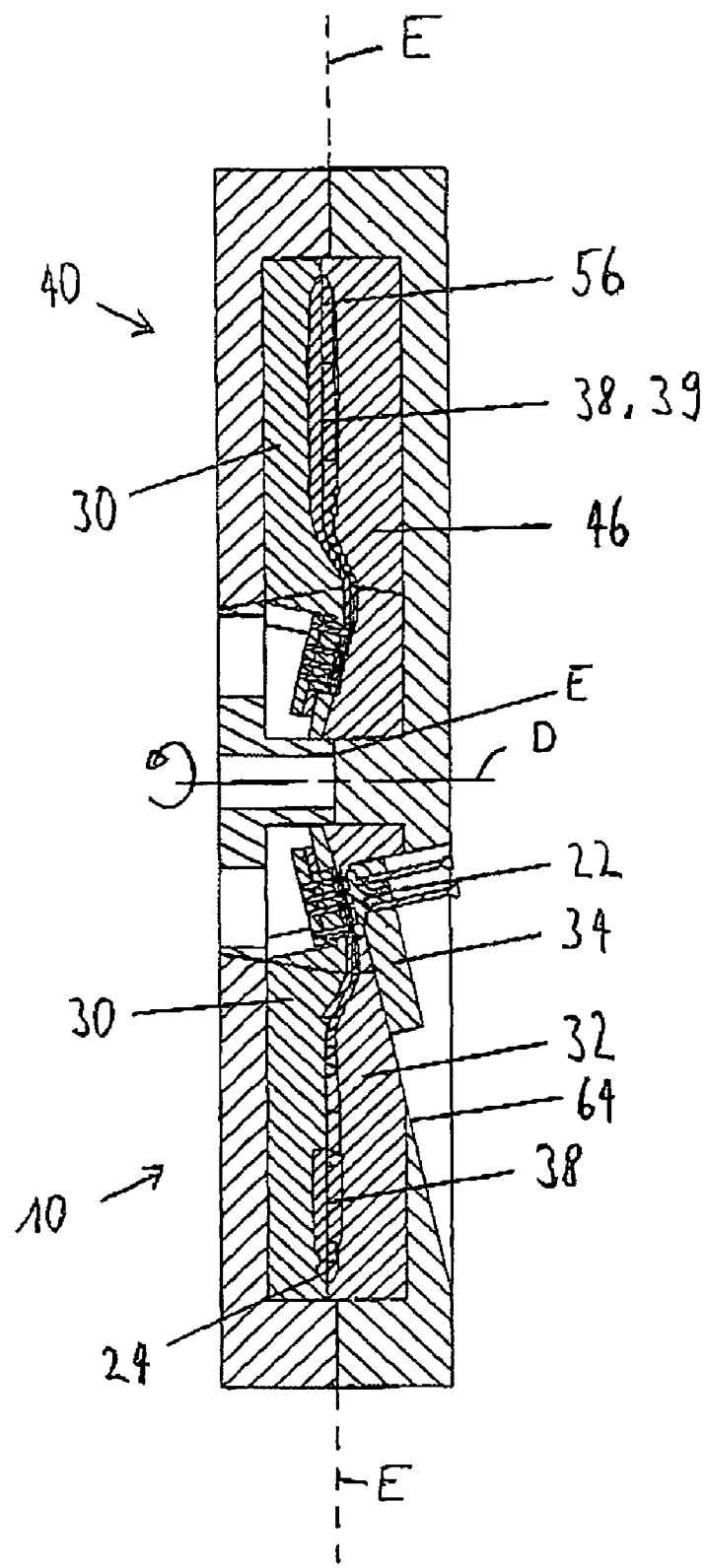
FIG. 8 shows a two-component injection-molding tool according to FIGS. 1-5.

FIGS. 1-5 show views of an injection-molding tool used for carrying out the method according to the invention in various stages of the method. FIG. 8 shows this tool in an overview. The aim is to produce a toothbrush with bristle clusters flexibly secured in sleeves according to EP-A 0 923 326.

Figure 1:
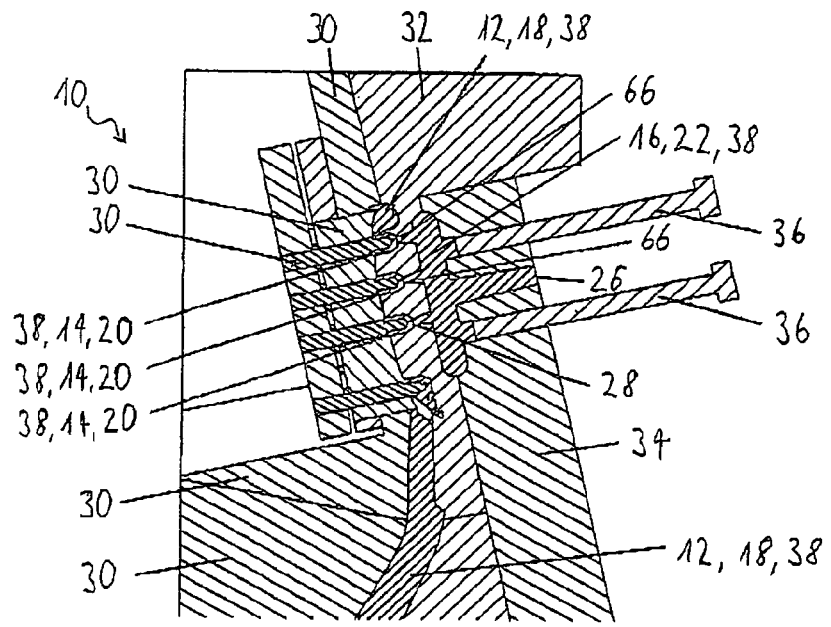
FIG. 1 shows a sectional view of a first injection mold with three part-molds after the injection of a first component.
Figure 2:
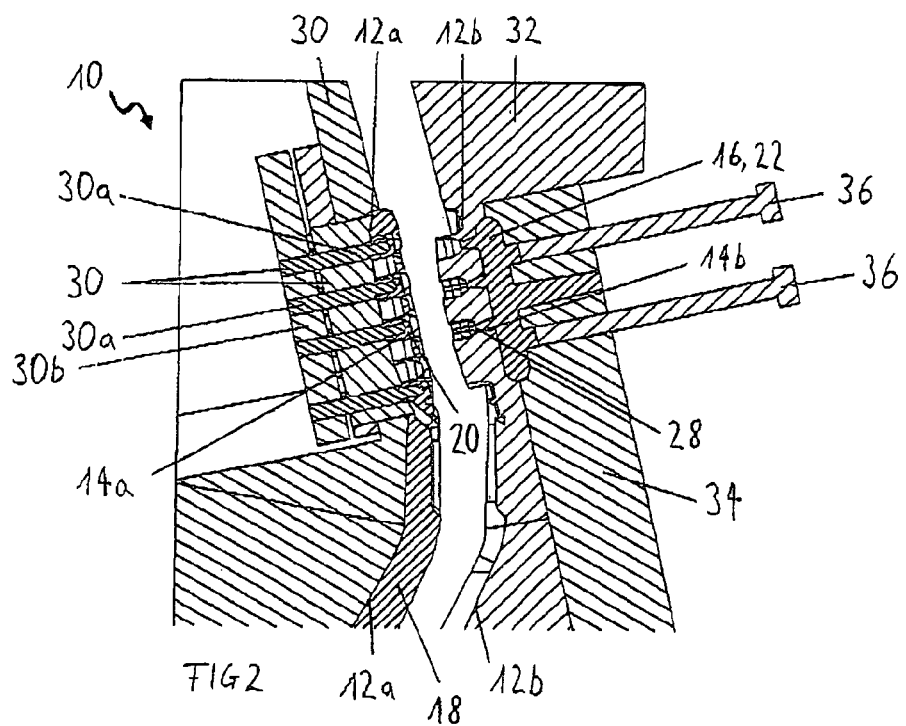
FIG. 2 shows a sectional view according to FIG. 1 after the separation of the first part-mold from the second and third part-molds.
Figure 3:
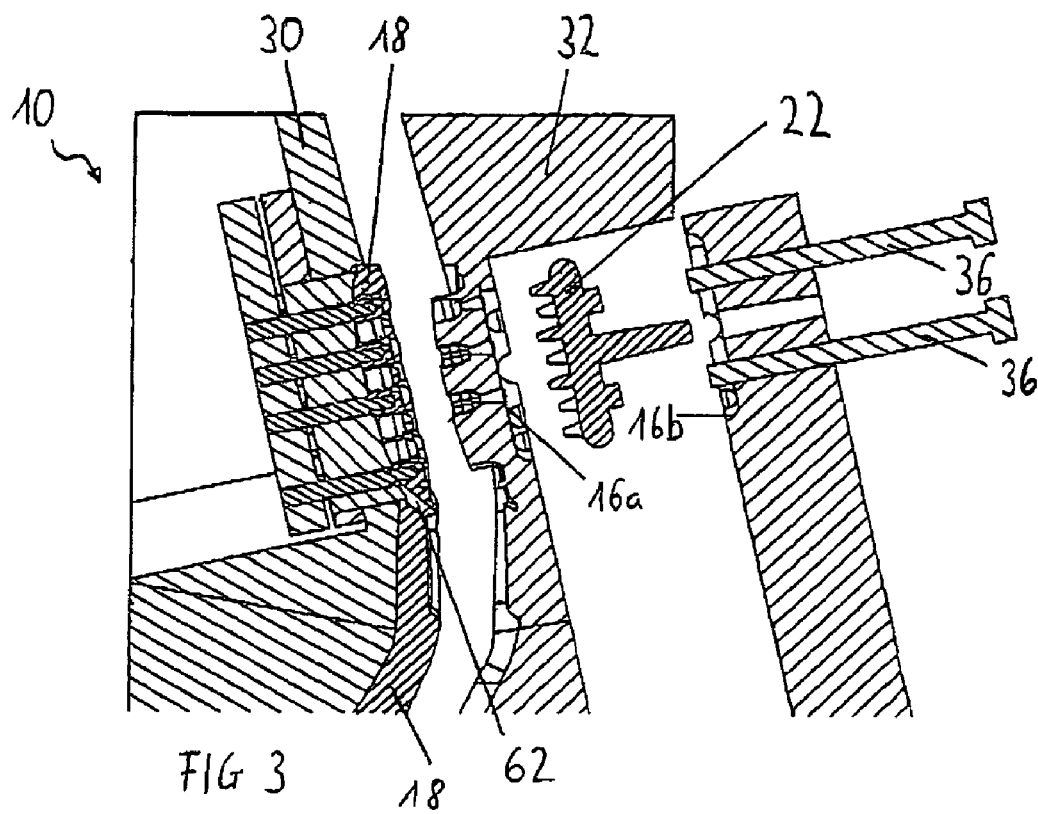
FIG. 3 shows a sectional view according to FIG. 1 after the separation of the second and third part-molds.

A first mold 10, represented in FIGS. 1-3, is made up of three part-molds 30, 32, 34, which may in each case be subdivided further. Between the first part-mold 30 and the second part-mold 32, both first hollow regions 12 are formed by wall regions 12a, 12b (see FIG. 2) and second hollow regions 14 are formed by wall regions 14a, 14b (see FIG. 2). The first and second hollow regions 12, 14 are not in connection with one another. The second hollow region 14 is subdivided into a number of subregions, which are likewise not directly in connection with one another. Between the second part-mold 32 and the third part-mold 34 there is a third hollow region 16, which is formed by wall regions 16a, 16b of the respective part-molds 32, 34 (cf. FIG. 3). This hollow region is in connection with the subregions of the second hollow region 14 by means of a number of arms 66. The arms 66 run conically and have a length of between 5 and 22 mm, preferably 17 mm. The connection of the arms 66 to the subregions is realized by means of narrow through-openings 28, which preferably have a round cross section with a diameter of 0.2-1.0 mm, with particular preference approximately 0.7 mm. If segments 20 produced in second hollow regions 14 have to receive a number of bristle clusters 58, it is proposed for reasons of stability to connect each of the corresponding part-sleeves to the third hollow region 16 by a single arm 66.

The first hollow region 12 is supplied with molten first component 38, preferably a hard component in the hot runner feed system, via a first injection point 24 (see FIG. 8), in order to produce the other regions 18 of the toothbrush consisting of the first component, with the exception of the segments 20. As represented in FIGS. 6a,b, 7a,b, the other regions 18 are an all-round periphery 52a of the head region 52 with preformed sleeves 52b for receiving bristles and parts of the neck region 54 and of the handle region 56 (see FIG. 8). A hot runner nozzle with a needle valve is preferably used for the first and third hollow regions.

The second hollow regions 14 are supplied with molten first component 38 indirectly by a material supply at the third hollow region 16 via a second injection point 26. Since solidified material 22 remains behind in the third hollow region 16, this is a case of material supply via a cold runner.

In spite of a number of injection points 24, 26, the first component 38 is preferably supplied by means of the same plasticizing unit, possibly by the cascade method. There is suitable control for the opening and closing of the material supply to the first and third hollow regions at times coordinated with one another.

As represented in FIG. 2, the first and second part-molds 30, 32 are separated from one another after the first component 38 is injection-molded and left to solidify. The second and third part-molds 32, 34 are separated simultaneously or preferably with a slight delay, cf. FIG. 3. The separating of the first and second part-molds 30, 32 has the effect that the solidified material 22 contained in the third hollow region 16 is torn off from the segments 20 which have been formed in the second hollow regions 14. This tearing-off can be carried out in a well-defined manner and with low expenditure of force on account of the small through-openings 28. Remaining behind in the first part-mold 30 are the other regions 18 and segments 20 separated from them and from one another. Here, these have the form of sleeves. The segments 20 may, however, also have the form of rings or cups, as explained further below. The sleeve-shaped segments 20 are fitted on pins 30a, which are part of the first part-mold 30 and serve for shaping the inner region of the sleeves or segments 20. The pins 30a can preferably be displaced in relation to a matrix 30b, in order to adapt the position of the sleeves in the brush head as a unit. Furthermore, it is possible to freely move the pins 30a, and consequently the segments 20, by removing the matrix 30b after the injection of the first component 38 (not represented here). This also allows the position of the segments 20 to be changed in relation to one another and in relation to the other regions 18, without a complicated holding and displacing mechanism for gripping and moving the small segments 20 being necessary.

In a further method step, outlined in FIG. 3, the second and third part-molds 32, 34 are also separated. The solidified material 22 is detached by means of ram-like ejectors 36, which can be displaced into the third hollow region 16, and is sent for disposal. The first mold 10 is preferably arranged for this purpose in such a way that the ejected material 22 falls by gravitational force into regions in which there are no further molds, so that it cannot become caught in further mold cavities or on finished or half-finished products. The separation of the sprue and runner system consequently preferably takes place, seen spatially, in the lowest station/mold of the multi-station tool. With preference, the sprue and runner system is gripped from below by means of a handling system or a robot and sent for disposal. This has the advantage of ensuring that no sprue and runner systems can jam between the platens.

Figure 4:
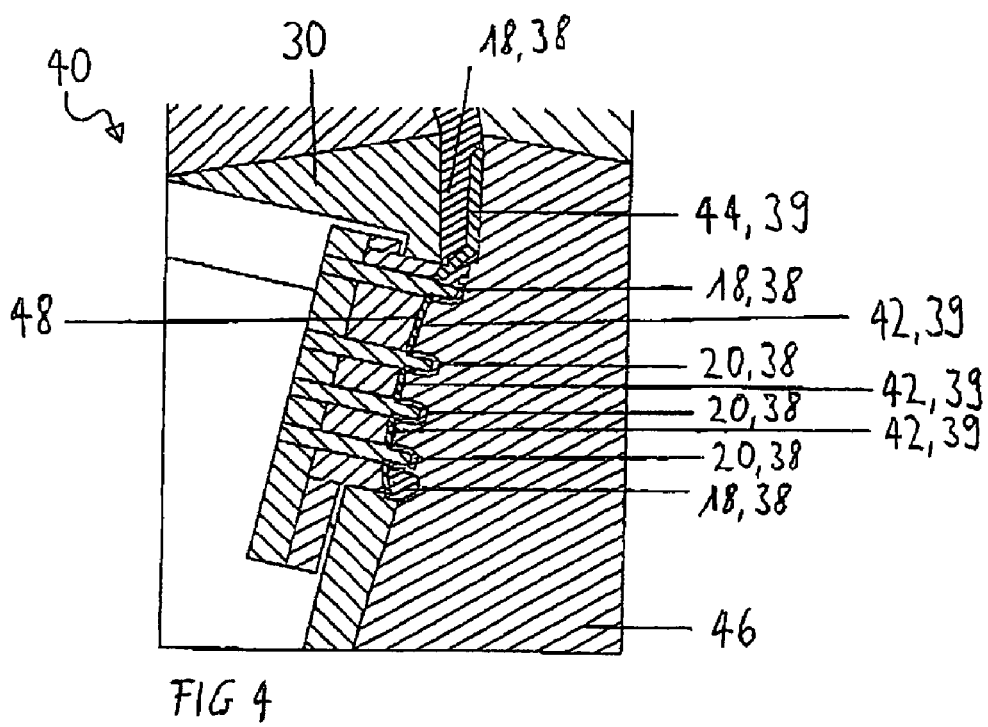
FIG. 4 shows a sectional view of a second injection mold with two part-molds after the injection of a second component.

In a further method step, the mold is changed. FIG. 4 shows the second mold 40 for injecting the second component 39. It comprises two part-molds, one of which is identical to the first part-mold 30 from the previous steps. This has the advantage that, apart from applying a new further part-mold 46, no steps are necessary for separate gripping and moving of the blank. The transfer into the second mold 40 preferably takes place by rotating and/or displacing the first part-mold 30, for example by rotation about an axis D through 180°, as shown in FIG. 8, or through 90°/120°, if additional polymer components are injected into further stations/molds. A manual mold change is also possible. The wall regions 48a, 48b (FIG. 5) of the further part-mold 46 are adapted in the region of the fourth hollow region 48 to the form of the segments 20 in such a way that there are merely thin connecting elements 42 injection-molded between the segments 20. For this purpose, the wall region 48b has for example depressions 48c, which substantially correspond to the form of the segments 20, but are less deep. In this way, the bottom 20b of the segments 20 is covered during the injection of the second component 39, while the upper periphery 20a remains free and is consequently surrounded by the second component 39. In order to ensure a good connection between the segments 20 and the second component 39, apart from the sheet-like membrane 43 a thin material layer is also injection-molded around the upper periphery and the adjoining regions of the sleeve-shaped segments 20. The membrane 43 preferably comes to lie as a collar around the segments 20. The segments 20 are securely anchored by the consequently locally greater material thickness of the membrane 43. The connecting elements 42 have altogether the form of a continuous membrane 43, in which the sleeve-shaped segments 20 are embedded at their upper periphery 20a, cf. FIGS. 6b, 7a, 7b. Furthermore, further regions 44 are injection-molded from the second component 39 at the neck and handle regions 54, 56. The molten second component 39 is supplied from the neck region 54 into the head region 52 via a channel 62 cut out in the first component 38 (see FIG. 3).

It is of course possible also to embed the segments 20 completely in the second component 39. This is preferably used if the segments 20 can be kept relatively thin. This is the case in particular when using the AFT or IMT method, in which the segments 20 are formed as rings that are open at the bottom. This method is discussed in still more detail later on.

For reasons of space, the injection point for the second component 39 preferably does not lie on the membrane 43 in the head region 52, but in the neck or handle region 54, 56. The displacement of the injection point also allows the otherwise low material consumption to be artificially increased, in order to maintain a minimum shot weight.

FIG. 5 schematically shows a further method step, in which the part-molds 30, 46 of the second mold 40 are separated from one another and the toothbrush body is removed.

FIG. 8 shows a two-component injection-molding tool according to FIGS. 1-5 with two molds 10, 40, the left-hand first part-mold 30 of each of which is identical. The part-molds 30 and 32/34 as well as 30 and 46 can be separated along a vertical plane E or in the region of the toothbrush slightly offset in relation thereto. The left-hand first part-molds 30 are also rotatable about the horizontally running axis of rotation D, in order to transfer a product after production of the first component into the second mold 40. When the first mold 10 is separated, the solidified material 22 in the third hollow region 16 falls downward over a sloping surface 64, and consequently cannot become caught in other products or molds.

In FIGS. 6a,b and 7a,b, various views of a brush head produced by the method according to the invention are represented. FIG. 6a shows part of a toothbrush 50 in a view from below at the head part 52, i.e. at the rear side facing away from the bristles. FIG. 6b shows the same toothbrush 50 in a view of the bristle-carrying front side of the head part 52. FIGS. 7a and b show the same brush in cross section and longitudinal section along the lines I-I and II-II, respectively.

The bristle clusters 58, only one of which is outlined, are secured in sleeve- or cup-like segments 20, which have preferably been conventionally provided with bristles by tufting. Here, one segment 20 holds one to three bristle clusters 58, but may also hold larger groups of bristle clusters or other cleaning structures, such as for example flexible cleaning elements. The openings of the sleeves 20 are elliptically shaped, in order to adapt themselves to the form of the anchor plates during conventional tufting. That is to say that the anchor plates are respectively placed in such a way that they come to lie substantially on the major axis of the ellipse. By the fact that the sleeve-shaped segment 20 consequently comes to lie around the anchor plate, the load it takes to pull out the bristles is increased. In order to make reliable tufting possible, the segments 20 are conically formed on the undersides 20b. The bottoms of the underside 20b preferably lie in one plane, so that during tufting they can be supported on an underlying surface. An underlying surface with a plurality of recesses into which the segments 20 fit, and by which they are well supported and laterally fixed during tufting, is preferably used. Although the membrane 43 may have a convex, arched basic form, the segments 20 preferably have a flat upper bounding surface. As a result, the inserting and anchoring of the bristle clusters 58 is likewise facilitated.

The connection of the sleeve-shaped segments 20 to the material 22 and the connection of the corresponding hollow regions 14, 16 is preferably such that each segment 20 is centrally connected on its underside to the material 22. The third hollow region 16, or the first component 38 present in it, acts as a distributing element during the injection-molding. As a result, good material distribution, clean detachment/tearing-off of the solidified material 22 and reduction of crack formation are made possible. The material connection preferably has a round cross section with a diameter of 0.2-1 mm, preferably 0.7 mm.

Alternatively, the segments 20 may also be provided with bristles by the Anchor Free Tufting (AFT) or In Mold Tufting (IMT) method. In the case of providing bristles by AFT, the segments 20 are preferably sleeves that are open at both ends, into which bristle clusters 58 are inserted, preferably after the injection of both components 38, 39, and are subsequently melted at their rear ends.

In particular in the case of the AFT method, initially only the carrier elements for the bristles, i.e. part of the bristle head, are produced by the method according to the invention. With preference, the carrier elements particularly comprise sleeve-shaped segments 20 that are open at both ends, connected by connecting elements in the form of a preferably thin membrane 43, which may also be perforated. The "other regions" 18 made of the first component 38 may be small. They serve in particular for the purpose of connecting, in particular welding, the carrier element to a separately produced brush body to form a complete toothbrush 50. The "other regions" 18 may also serve the purpose of lending the carrier element the necessary stability, if the membrane 43 does not have the necessary intrinsic stability, for example in that it is formed as an all-round or arcuate periphery or as two webs on which or between which the membrane is mounted. The segments 20 are preferably formed together with the other regions from a single injection point in the hard component 38. The elements to be welded between the AFT carrier element and the actual toothbrush body preferably consist of the same hard material, in order to increase the material compatibility and consequently the durability of the weld seam. However, the main method steps for forming the segments 20 remain as already described. Examples of such carrier elements and toothbrushes produced with them are described further below with reference to FIGS. 11-15.

In the case of providing bristles by IMT, the bristle clusters 58 are inserted through suitable clearances into the first mold 10 already before the injection of the first component 38 and are encapsulated at their rear ends with the first component 38 and in this way anchored in the segments 20 or other regions 18. Fixing by the second component 39 is also possible.

The segments 20 produced from the first component 38, a hard component, are located in the head region 52 of the toothbrush 50 and, in this configurational variant, are surrounded by an all-round periphery 52a, which likewise consists of the hard component. However, the segments 20 are not connected to this periphery 52a directly, but only via the membrane 43, acting as a connecting element 42, which consists of the second component 39, a soft component. Integrally formed with the periphery 52a are further sleeves 52b, which likewise serve for securing bristles. The periphery 52a together with the regions of the neck and handle regions 54, 56 that consist of the hard component form the "other regions" 18, which are injection-molded in one operation together with the segments 20.

The membrane 43 is merely attached at the open end, to the upper periphery 20a of the segments 20 and to the upper side of the periphery 52a of the head part 52. In this way, very flexible mounting of the segments 20 is obtained, making great mobility of the segments 20 relative to one another and to the periphery 52a possible. The bristles of the toothbrush 50 produced in this way are particularly compliant and adaptable as a result of the mounting, making particularly gentle teeth cleaning possible.

The rear side of the toothbrush 50 is covered by a cover element 60, so that no remains can become lodged between the segments 20. This cover element 60 preferably consists of a transparent or translucent hard or soft material, so that the movable mounting is visible from the outside and can be shown directly to the purchaser. For fastening the cover element 60, the periphery 52a of the head region 52 preferably has an all-round welding edge 52d. The all-round frame of the front side that is formed as a result forms the support for the waterproof welding of the cover element 60.

The segments 20 (individual sleeve) are preferably between 2 and 6 mm (with preference 3 mm) deep and between 2 and 4 mm (with preference 3 mm) wide. The membrane 43 is preferably between 0.3 and 3 mm thick, with particular preference between 0.6 and 1.0 mm. This allows the segments 20 to perform a tumbling movement. The distance between the segments 20 is preferably at least 0.2 and at most 3 mm. They preferably take up at least half the surface of the membrane 43 or of the surface area defined by the periphery 52a. Their bottoms 20b are preferably kept at a distance from the cover element 60 of at least 1-3 mm.

The membrane 43 may be arched (convexly or concavely) or flat. The upper peripheries 20a of the segments 20 preferably have a flat upper bounding surface, for better insertion and anchorage of the bristle clusters 58. The segments 20 are preferably laterally and/or horizontally fixed for the insertion of the bristle clusters 58.

In the same production step, additional rubber-elastic cleaning or massaging elements, which are integral with the membrane, may be formed from the same material as the membrane.

In an alternative embodiment (not represented), the connecting elements 42 also extend over the entire height of the segments. A different mobility of the segments 20 is obtained as a result. In this case it is possible to dispense with a form-determining all-round periphery 52a of a hard component 38. It is also possible to connect the segments 20 not over their full surface area but only by thin webs of the hard or soft component. This produces head structures with openings between the individual segments 20. The flexibility of the head can be specifically influenced as a result.

FIG. 9 shows a further (not yet finished) toothbrush 50 produced by the method according to the invention in longitudinal section after the injection of the first component 38 of the body 50'. To produce the first component 38, a first mold is used, substantially formed as shown in FIGS. 1-3 and comprising three part-molds (not represented here). The contact surface between the second and third part-forms has in this case the form of a plane and is designated by E.

In the case of the toothbrush 50 to be produced, individual segments 20 are formed both in the handle region 56 and in the neck region 54. The segments 20 in the handle region 56 may have the form of bars running in the transverse direction. The segments 20 in the neck region 54 are bar-like and in the finished state serve in conjunction with the soft component as an elastic bending zone. The second hollow regions 14 are therefore divided into two groups, which are of a form complementing the segments 20 in the handle region 56 and the neck region 54, respectively. The segments 20 in the handle region 56 are connected to one another by means of a first distributing element (solidified material 22) of the first component 38, which is of a form complementing the third hollow region 16. This region is supplied with the first component 38 via an injection point 26, so that material is directed into the second hollow regions 14, solidifies there as segments 20 and in the third hollow region 16 solidifies as material 22. The segments 20 in the neck region 54 are connected to one another by means of a further distributing element (solidified material 22') of the first component 38, which corresponds to a further third hollow region 16'. This region is supplied with the first component 38 via a further injection point 26'.

In the case of the present example, the openings 28 between the second and third hollow regions 14, 16 lie in the separating plane E. This facilitates demolding, in particular the detachment of the third part-mold and the distributing elements (22, 22'), and the production of the part-mold.

However, the position of the segments 20 in relation to one another and to the other regions of the first component 38 (part of the neck region 54, head region 52) does not correspond to the desired final state. In the case of the finished body 50', which is shown in section in FIG. 10, in the handle region 56 the gaps 70 between the segments 20 and the other regions are reduced and the distances between the segments 20 are increased. Furthermore, some of these segments 20 and the segments 20 in the neck region 54 have been displaced in the plane of the drawing perpendicularly in relation to the separating plane E, in order that their contours are adapted to the contour of the toothbrush 50 with a slightly curved body 50'.

The described relocation of the segments 20 in relation to the other regions of the first component 38 takes place after the detachment of the distributing elements (22, 22') when changing between the first mold 10 and the second mold 40. A suitable handling unit is preferably used; the segments 20 may, however, also be simply allowed to fall into corresponding clearances in the second mold.

FIG. 10 shows the finished body 50' of the same toothbrush 50 after relocation of the segments 20 and after the injection of the second component 39. The second component 39, which is a soft component here, has the effect that the segments 20 are resiliently embedded and are connected to the other regions of the first component 39 to form a continuous body 50'. This is subsequently provided with bristles in the head region 52 in a known way.

FIGS. 11-17 show further variants of toothbrushes 50 and carrier elements 68 for toothbrushes 50 which have been produced by the method according to the invention. In the case of the examples from FIGS. 11a-e, FIGS. 12a-e and FIGS. 13-15, carrier elements 68 are firstly produced by the method according to the invention, provided with bristles and subsequently connected to a separately produced body 50'. In the case of the examples from FIGS. 16 and 17, the entire brush body 50' is produced by the method according to the invention and subsequently provided with bristles.

In the case of the examples from FIGS. 11a-e, FIGS. 12a-e and FIGS. 13-15, in a first step a plurality of sleeve-shaped segments 20 and the other regions 18 of the carrier element 68 are produced from a first component 38, in particular a hard component. In a further step, connecting elements 42 in the form of a membrane 43 are molded on. The membrane 43 is thinner in a direction perpendicular to the carrier element 68 than the segments 20, which protrude from the membrane 43 on both sides (see. FIGS. 11e, 12e). The segments 20 may in principle be of any desired form, but are preferably in the form of sleeves or cups and, perpendicularly in relation to the carrier element 68, are open at one or both ends. In the case of the conventional provision of bristles by tufting, the cross-sectional area of the segment openings is preferably elliptical, as shown on the left in FIG. 11b. In the case of the conventional provision of bristles, segments 20 with openings at one end are produced (for example as in FIGS. 7a,b).

In the case of providing bristles by AFT, any other desired cross-sectional openings may be realized, for example in the form of a figure of eight or a kidney shape, as shown in the middle and on the right in FIG. 11b. The segments 20 have continuous channel-like openings 72, through which bristle clusters 58 can be led after the production of the carrier element 68. These are subsequently melted at their rear ends, in order to anchor them on the carrier element 68.

In the example of FIGS. 11a-e, the other regions 18 form an elliptical closed periphery 74 (similar to the all-round periphery 52a), onto which further sleeves 76 (similar to the further sleeves 52b) are directly molded. They serve like the segments 20 for fastening bristles and are open at one or both ends. Within the periphery 74 there are a number of segments 20 of different shapes and sizes. They are connected to one another and to the periphery 74 by the membrane 43. The membrane 43 is preferably elastic, so that elastic bristle anchorage is realized.

The carrier element 68 is subsequently provided with bristles 58 conventionally or by means of AFT (FIG. 11d).

A brush body 50', which has the form of a spoon with a recess in the head region 52 (FIG. 11c), was produced in a separate operation. Formed in the head region 52, or at the periphery of the recess, is an all-round edge 78, against which an outer edge 80 of the carrier element comes to bear. The carrier element 68 and the body 50' are undetachably connected to one another, preferably by welding, along the line 78/80 (FIG. 11e).

The welding area may be partially interrupted by openings or other materials, in particular soft materials. Variants in which an exchangeable-head toothbrush is realized by a detachable connection of the other regions 18 to the body 50' are also advantageous.

In the example of FIGS. 12a-e, in a first method step a plurality of sleeve-shaped segments 20 and two straight, cross-sectionally L-shaped material pieces 82 are produced from the first component 38, a hard component (FIG. 12a). The material pieces 82 may be identified as the "other regions" 18. The membrane 43 is injection-molded as a connecting element 42 between the material pieces 82 and the segments 20 (FIG. 12b). The carrier element 68 produced in this way is subsequently provided with bristles conventionally or by means of AFT (FIG. 12c). A separately produced brush body 50' is bent in the head region 52 to form a carrying structure and has two edges 78, running in the transverse direction and serving as anchoring locations for the carrier element 68, and consequently indirectly for the membrane 43. The elongate material pieces 82 are fastened to these, preferably by means of welding. The underside 80' of the material pieces 82 is thereby adapted to the edge 78.

The previously planar carrier element 68 may be connected to the head region 52 of the body 50' under prestress, so that it arches up and creates a cushion-like structure, by which the bristles 58 are mounted in a particularly resilient manner (FIGS. 12d+e). The head region 52 may be open at the sides, as shown in FIG. 12d, or closed at the sides, in a way analogous to FIG. 11, but without a lateral weld seam. The carrier element 68 may also be bent already before insertion into the body 50', for example in that the membrane 43 is produced in a correspondingly bent form or in that it is thermoplastically deformed during or after being provided with bristles, for example by a bent AFT die.

FIGS. 13, 14 and 15 show variants of the toothbrush 50 that is shown in FIG. 12. The brush body 50' is bent in the head region 52, branched one or more times toward the front end to form a skeletal carrying structure and has two, four or eleven plate-shaped anchoring locations 84, formed at the end of a branch. A further anchoring location 84 is formed, as in the case of FIGS. 12d+e, as an elongate edge 78 at the transition from the head region 52 to the neck region 54. The corresponding carrier element 68 has, as in the case of FIGS. 12b+c, an elongate material piece 82 at one end, and, distributed in a way corresponding to the anchoring locations 84, two, four or eleven plate-like material pieces 82', between which the membrane 43 is located. These may serve exclusively for anchoring the carrier element 68 to the brush body 50' (FIGS. 13+14) or additionally also themselves carry bristle clusters 58 (FIG. 15). Depending on the arrangement of the anchoring locations 84 and the material pieces 82, 82', the membrane 43 is connected to the body 50' without stress, drawn in length or width or made to arch up. The more anchoring locations 84 there are, the more possibilities for variation there are with regard to the form of the membrane, and consequently the elastic properties of the bristle mounting. The anchorage between the holding locations is preferably performed by means of ultrasound. This allows edges of the carrier element 68 to engage in grooves of the holding locations with a positive and non-positive fit.

Figure 16A:
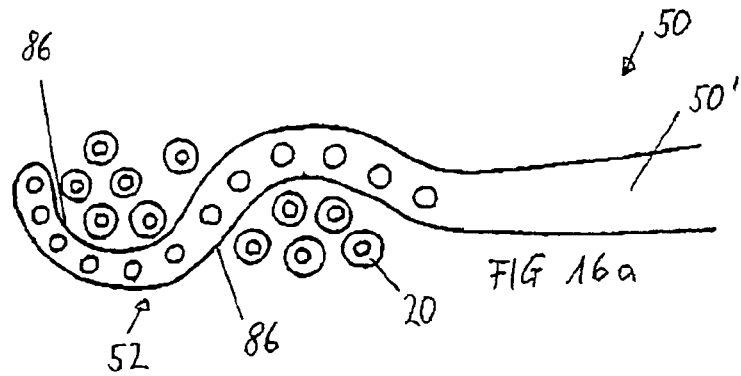
FIGS. 16, 17 show examples of toothbrushes which have a membrane in the head region, with a brush body produced by the method according to the invention.
Figure 16B:
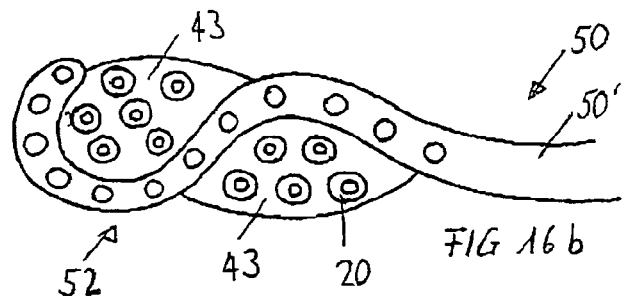
Figure 16C:
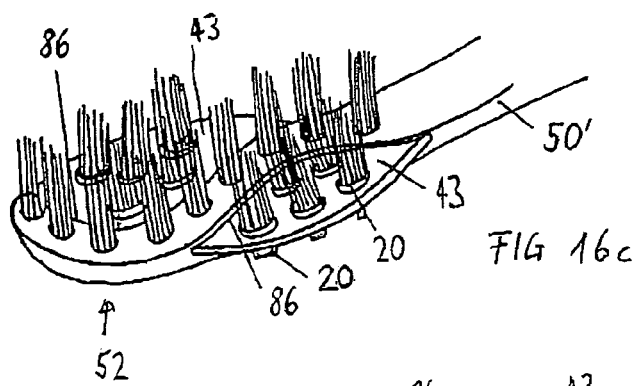
Figure 17B:
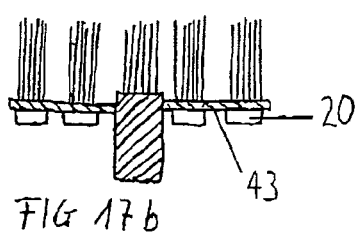
Figure 17A:
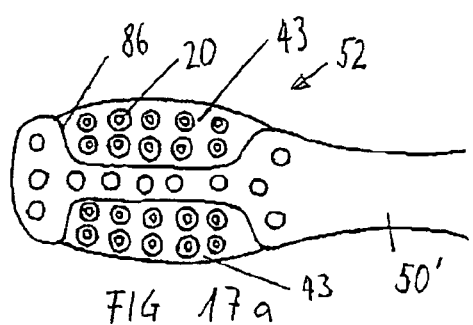

FIGS. 16a-c and 17a+b show two examples of a toothbrush 50, in which the hard component of the entire brush body 50' and the cup-shaped segments 20 are injection-molded in one operation. The hard component of the entire brush body 50' is formed, in particular in the head region 52, in such a bent manner that bent all-round surfaces 86 are formed, serving as a lateral boundary and anchorage for a membrane 43. "Bent" is understood here as also meaning pieces of the all-round surface that run straight but are arranged at angles to one another (see FIG. 17a). In the case of FIGS. 16a-c, the hard component is bent in the form of an S in plan view. The membrane 43 is subdivided into two subregions, which are respectively located between an arc of the S structure. In the case of FIGS. 17a, b, the hard component has a structure in the form of an H in plan view. The membrane 43 is in turn subdivided into two subregions, which are respectively located—seen in plan view—above and below the longitudinal axis of the brush. The segments 20 have the form of cups that are closed at the bottom and are embedded at their upper periphery in the membrane 43, which is thin in relation to the depth of the cups (see FIG. 17b). Brush heads of this type are provided with bristles conventionally, since the head region 52 provided with the segments 20 is integrally formed with the remaining brush body 50'. Carrying structures such as the S or H form shown may however also be used in the case of separately produced carrier elements 68, as in FIGS. 11-15.

Carrier elements 68 used as AFT brush heads are generally produced from the same hard component as the brush body 50', in order to ensure satisfactory welding to the brush handle. Polypropylene (PP) is preferably used as the hard component. A thermoplastic elastomer (TPE) that bonds, i.e. has an affinity, with PP is preferably used as the soft component. This TPE is provided for the creation of flexible regions of the AFT head and/or for the forming of rubber-elastic cleaning elements. By means of the AFT method, conventional bristles with a diameter of 0.1-0.25 mm are subsequently anchored on the AFT brush head by means of melting the bristles on the rear side of the AFT brush head, for example as described in EP 1136016. Conventional bristles preferably consist of a thermoplastic, preferably of polyamide (PA) or polyester (PBT). This melting of the bristles produces a melt carpet, which is substantially up to 1 mm thick and is somewhat higher at the peripheries as a result of material displacement. This melt carpet of the material of the bristles is brittle. Moreover, the bristle melt does not bond with the brush head plate, in the examples shown with the segments 20 arranged, if required, on the carrier element 68, as a result of the melting. This has the disadvantage, in particular in the case of flexible mounting of the AFT brush head, that the bristle melt may separate itself from the AFT brush head plate, and even break up into individual subregions.

This has a number of negative consequences for the quality of the AFT brush heads:
a) Water can get into the hollow space through the openings, which may lead to hygiene problems.
b) The load it takes to pull out the bristles and bristle clusters 58 is reduced, since the bristle carpet can break up into small individual regions. If a single part becomes as small as the cross section of a cluster, there is no longer any restraining effect.
c) In the case of brush heads with structures that are open at the rear, the bristles can fall out of the head plate to the rear.

To solve these problems, it is proposed to treat the bristles or the brush head before melting in such a way that adhesion between the AFT head plate and the bristles is produced by the melting during the AFT process. In order to achieve this, various possibilities are available:

In a first variant, an additive which brings about adhesion between the material of the head plate and the conventional bristles is added to the material of the AFT head plate. Here there are so-called adhesion promoters, which can be admixed during the injection-molding process of the AFT head plate or be contained already in the injection-molding granules. When the bristles are melted on the rear side of the AFT head plate, the bonding/adhesion of the melt carpet and the bristle plate is then produced. If soft material is also contained in the AFT bristle head, as for example in the case of the carrier elements 68 described above with a membrane 43, the adhesion promoter may also be admixed with the soft material. As in the case of the hard material, this adhesion promoter of course corresponds to the corresponding bristle material.

Material example 1: polypropylene PP of the head plate contains an additive (adhesion promoter) for polyamide PA. During the melting of the PA bristles, the bristle melt enters into a bond with the PP of the head plate. Since the bristle handle (bristle body 50') likewise consists of PP (without adhesion promoter), it must be ensured that the welding to the bristle handle is not adversely influenced by addition of the adhesion promoter.

Material example 2: polypropylene PP of the head plate contains an additive (adhesion promoter) for polyester PBT. During the melting of the PBT bristles, the bristle melt enters into a bond with the PP of the head plate. Since the bristle handle (bristle body 50') likewise consists of PP (without adhesion promoter), it must be ensured that the welding to the bristle handle is not adversely influenced by addition of the adhesion promoter.

Wherever possible, commercially available products, used in particular in the production of composite films or composite tubes, are used as the adhesion promoter. These are for example maleic anhydrides (MSA), EVAC, EBA, SB/PE block copolymer, SB/PP block copolymer, SB blends, etc. The concentration is less than 5%, preferably less than 1%.

In order to increase the contact surface between the bristle melt and the AFT brush head, it is also proposed to provide projections and depressions in the head plate. However, by contrast with WO 99/11156, these are neither deformed nor incipiently melted. The rear side of the head plate is preferably roughened, for example with eroded structures having a maximum difference in height of 0.5 mm, preferably 0.1 mm. The method according to WO 99/11156 has the disadvantage that the melting of the plate and bristle material produces a relatively thick melt carpet, which adversely influences the flexibility. Mixing of the materials has the effect of producing an undefined material mixture with indefinable properties.

In a further variant, the adhesion promoter is added to the bristle material.

Material example 3: polypropylene PP of the head plate. During the melting of the polyamide PA bristles, which contain an adhesion promoter for polypropylene PP, the bristle melt enters into a bond with the PP of the head plate.

In a further variant, the head plate is pretreated before the AFT process. In the case of polypropylene, the surface tension may be reduced for example by means of a corona flash or flame treatment.

In a further variant, before the AFT process the surface of the head plate is coated or sprayed with an agent which acts for example in the manner of a catalyst during the melting of the bristles, likewise with the effect of bringing about a bond/adhesion between the head plate and the bristle melt. This agent may be an adhesive or likewise an adhesion promoter.

All these variants have the advantage, in particular in the case of AFT, that it is only necessary to pretreat the carrier plate, which only comprises a small surface area or a small volume of material. The remaining part of the toothbrush, in particular the voluminous and heavy handle, can be produced conventionally. This allows material and time to be saved.

In particular in the case of brush heads which are open, i.e. on which the bristle melt is visible (FIGS. 12-15), it is of advantage to laminate them, for example by welding on a thin plastic element, applying a film of plastic by means of adhesive attachment or by spraying with paint, lacquer or adhesive resin, by means of a further process step on the AFT installation and before the welding to the brush handle (brush body 50').

This operation can fix the bristle melt to the AFT brush head in addition to the measures mentioned above. It must be ensured here that the welding edges on the AFT brush head plate that are necessary for the welding to the brush handle are freed.

The above proposals for improved adhesion of the bristle melt are advantageously used in the case of the carrier elements 68 produced according to the invention for the provision of bristles by AFT. There is the possibility of likewise adding an adhesion promoter to the soft material. However, it is usually adequate to add adhesion promoter to the hard component. However, the proposals mentioned may also be used independently of the production method described above in the case of other AFT heads or in the case of other methods of providing bristles, such as IMT (EP 0346646) or methods according to EP 1312 281.

FIGS. 18 to 21 show the production of a further toothbrush 50 at different points in time.

As FIG. 18 shows, two parts 116, 118 of the toothbrush 50, to be specific the toothbrush body 50' and a toothbrush tongue 88, are produced in an injection-molding cycle from a first component 38 in the corresponding hollow regions 12, 14 (cavities) of the first mold 10 (compare FIGS. 1-5, 8, 19-21). The hollow regions 12, 14 may, as shown in FIG. 18, be supplied with the liquid polymer material from a gate via a sprue and runner system. It is also possible to feed each hollow region 12, 14 via a gate of its own. In the first case, the two parts 116, 118 of the toothbrush 50 consist of the same plastic, a hard component, of the same color. In the second case, the two parts 116, 118 may consist of different plastics of the same color or different colors, or of the same plastic of different colors.

As revealed in particular by FIG. 19, the one-piece toothbrush body 50' has a handle region 56, a neck region 54 and a head region 52. In the neck region 54 and the head region 52, the toothbrush body has a clearance 90 right through from the upper side to the underside in the form of a spoon. This clearance 90 is surrounded by an all-round periphery 52a, which is integrally formed onto the handle region 56. In the head region 52, the periphery 52a has a series of cup-like depressions 92, which are open on the upper side, closed on the underside and are intended for receiving bristle clusters 58. They are produced in the first injection-molding cycle.

Furthermore, the toothbrush body 50' has on the upper side in a front part of the handle region 56 adjoining the neck region 54 a receiving depression 94, which is provided with two blind-hole-like positioning holes 96, which are arranged one behind the other on the longitudinal center axis of the toothbrush 50.

Seen in plan view, the toothbrush tongue 88 likewise has the shape of a spoon. It is shaped in such a way that it fits in the clearance 90, while leaving a narrow gap 102 between it and the all-round periphery 52a. In the head region 52, the toothbrush tongue 88 is likewise provided with depressions 92 for receiving bristle clusters 58. In the end region remote from the head region 52, the toothbrush tongue 88 has a plate-like fastening region 98, which is shaped equally and oppositely in relation to the receiving depression 94 and is provided with pin-shaped positioning studs 100, which are arranged in a way corresponding to the positioning holes 96.

In a subsequent method step, the toothbrush body 50' and the toothbrush tongue 88 are moved in relation to one another (displaced and possibly rotated), so that the toothbrush tongue 88 comes to lie in the clearance 90 and the fastening region 98 comes to lie in the receiving depression 94, the positioning studs 100 engaging in the positioning holes 96.

As indicated in FIG. 20, the toothbrush body 50' and the toothbrush tongue 88 are encapsulated—in a fourth hollow region 48 of a second mold 40—with a second component 39, for example a soft component. The second component 39 reaches in an enveloping manner around the toothbrush body 50' and the toothbrush tongue 88 in the region of the receiving depression 94 and the fastening region 98, as also shown by FIG. 21. The toothbrush tongue 88 is held in the manner of a bending bar that is mounted at one end and can resiliently yield during cleaning of the teeth.

Finally, the periphery 52a and the toothbrush tongue 88 are provided with bristles by generally known methods described above.

It is of course also possible to provide or form further regions of the toothbrush with soft material, as is generally known.

FIGS. 22 to 24b show parts 116, 118 of a further toothbrush 50. The production of the toothbrush 50 is based on a similar procedure to that which has been described in relation to FIGS. 18 to 21.

FIG. 22 shows, in a way similar to the embodiment that is shown in FIG. 19, a first part 116 with an integrated toothbrush tongue 88 in plan view. The toothbrush tongue 88 has in turn, seen in plan view, the shape of a spoon in the head region 52 and in the neck region 54. It is shaped in such a way that it fits in a clearance 90 of a second part 118, shown in FIG. 23, so that essentially there only remains a narrow gap 102 between it and the all-round periphery 52a of the second part 118. In the head region 52, the toothbrush tongue 88 is likewise provided in turn with depressions 92 for receiving bristle clusters 58.

In the case of the present embodiment, the first part 116 is produced from a first component 58, preferably a hard component, of a first color.

As a difference from the embodiment of the toothbrush tongue 88 that is shown in FIG. 19, the first part 116 of the toothbrush 50 in the present embodiment does not already end in the front region of the handle region 56, but extends further over a significant part of the handle region 56, where it forms the fastening region 98.

In a way similar to the embodiment shown in FIG. 19, FIG. 23 shows a second part 118 with a likewise spoon-shaped clearance 90 for receiving the first part 116 in plan view. Like the first part 116, with preference the second part 118 is integrally designed and likewise has a handle region 56, a neck region 54 and a head region 52. By contrast with the embodiment shown in FIG. 19, the second part 118 has in the head region 52, neck region 54 and in the handle region 56 a clearance 90 right through from the upper side to the underside, which is intended for receiving the first part 116. The second part 118 accordingly forms a frame, or a toothbrush frame, for the first part 116.

The clearance 90 is bounded in the head region 52 by an all-round periphery 52a, which is integrally formed onto the handle region 56. In the head region 52, the periphery 52a has a series of cup-like depressions 92, which are open on the upper side, closed on the underside and intended for receiving bristle clusters 58. They are produced in the first injection-molding cycle.

The second part 118 is produced with preference in the same injection-molding cycle as the first part 116, but in a separate cavity. In a further mold 10', shown FIG. 25, the second part 118 is simultaneously produced in the same tool (mold 10') likewise with the first component 38, of a first color, preferably a hard component. However, it is also conceivable for the second component 118 to be produced from a component 38' that is different from the first component 38 and is of the same color as the first component 38 or of a different color. Furthermore, it is conceivable for the component 38' to consist of the same material as the component 38, but be of a different color.

FIGS. 24a and 24b show in plan view and in side view the toothbrush 50 not yet provided with bristles, in which the first part 116 from FIG. 22 has been inserted into the second part 118 from FIG. 23. The first part 116 is fixed with respect to the second part 118 by a second component 39, with preference a soft component, partially enclosing the two parts 116, 118. The second component 39 is applied in a separate, second injection-molding cycle or injection-molding operation. FIG. 24a therefore shows a second injection point 26 on the rear side of the toothbrush 50 in the rear handle region 56. The fixing with the second component 39 in an enveloping manner took place with preference only in the handle region 56, so that the toothbrush tongue 88 remains free in the head and neck regions 52, 54. This has the consequence that the toothbrush tongue 88 of the first part 116 can swing out in the direction of the upper side and underside of the toothbrush 50 in relation to the second part 118 thanks to the gap 102. The fixing in the handle region 56 has the effect that the toothbrush tongue 88 of the first part 116 is held in the manner of a bending bar mounted at one end and can resiliently yield during cleaning of the teeth, whereby the toothbrush 50 becomes compliant and adaptable, in particular in the two-part head region 52, whereby particularly gentle teeth cleaning can be made possible.

In the embodiment shown in FIGS. 24a and 24b, the first part 116 and the second part 118 are only partially enclosed by the second component 39, so that certain regions of the first part 116 and/or of the second part 118 on the finished toothbrush 50 remain fully or partially visible for the customer. For example, indicated in FIG. 22 are a first island region 104 and a second island region 106, which remain visible in the joined-together toothbrush 50 in FIGS. 24a and 24b. The second part 118 can be seen in FIGS. 24a and 24b in the form of an all-round strip.

The bristle area is in two parts. A first part of the bristle arrangement is located in the head region 52 of the first part 116, while the second part of the bristle arrangement is arranged in the head region 52 of the frame-like second part 118.

It is conceivable for the second component 39 to consist of the same material as the first component 38, it being possible for it to be of the same color as the first component 38 or a different color.

FIGS. 25 and 26 show a tool for the production of the parts 116, 118 of a further embodiment of the toothbrush 50 that are shown in FIGS. 22 and 23.

In a way similar to the multi-part first mold 10 shown in FIGS. 1 to 3, the first mold 10' that is shown in FIG. 25 also has a first part-mold 30, a second part-mold 32 and a third part-mold 34. For this purpose, the first mold 10' also comprises an index plate 108.

In a way similar to the tool shown in FIG. 8, it is conceivable for the index plate 108 and the slide 34 to rotate about an axis of rotation D, while the first part-mold 30 and the second part-mold 32 are arranged in a stationary manner.

The mold 10' shown in FIG. 25 is represented in longitudinal section, the third part-mold 34, in the form of a rib-shaped slide, not being shown in the sectional representation for the purpose of better representability. Depressions for forming the first island region 104 and the second island region 106 are represented by dashed lines.

On account of the small size of the gap 102 between the toothbrush frame, or the second part 118, and the toothbrush tongue 88, or the first part 116, the two parts 116, 118 are produced offset in relation to one another in different separating planes F1, F2 in the first mold 10'. FIG. 26 has a cross-sectional representation through the sectional plane III-III of the first mold 10, shown in FIG. 25, and serves for illustrating the relative offset of the cavities or hollow spaces in the separating planes F1 and F2.

The production is described below with reference to both FIGS. 25 and 26.

The first part-mold 30 is arranged adjoining the second part-mold 32. The first part-mold 30 has on its side facing away from the second part-mold 32 a V-shaped recess with two side walls 110 and a U-shaped bottom, which is referred to as wall surface 12b. The lowermost part of the side walls 110 and the bottom of the V-shaped recess are shaped in a way corresponding to the upper side of the first part 116 from FIG. 22.

Adjacently adjoining the first part-mold 30 is the index plate 108. Adjacent this index plate 108 is the third part-mold 34, which is referred to hereafter as slide 34. In this case, the slide 34 passes through the index plate 108, which likewise has two widening, sloping side walls 114, which lie in the same planes as the side walls 110, in an upper end position of the slide 34 in such a way that the side wall 112 of the slide 34 fits snugly against the side walls 110, 114 of the first part-mold 30 and of the index plate 108. In the upper end position of the slide 34, an end face of the slide 34 forms a wall region 12a and thereby bounds the first hollow region 12. The wall region 12a of the slide 34 thereby defines a separating plane F1 of the first hollow region 12. The wall surface 12a has a shape corresponding to the upper side of the first part 116 that is shown in FIG. 22. The first hollow region 12 has the shape of the first part 116, which has the toothbrush tongue 88. The slide 34 has on the one hand the inner contour of the second part 118 and on the other hand part of the outer contour in the shape of the upper side of the first part 116.

Arranged at the periphery of the first part-mold 30, adjacent the index plate 108, is a second wall region 14a. The second separating plane F2 is located between the index plate 108 and the first part-mold 30. The surface of the index plate 108 in the region opposite the first wall region 14a defines a second wall region 14b. Together with the side wall 112 of the slide 34, the wall regions 14a and 14b bound the second hollow region 14. The second hollow region 14 has the shape of the second part 118, which forms the toothbrush frame, or the second part 118 of the toothbrush 50.

Furthermore, the second part-mold 32 has a first injection point 24. Between the first part-mold 30 and the second part-mold 32, a third hollow region 16 is bounded by a wall region 16a, assigned to the second part-mold 32, and a wall region 16b, assigned to the first part-mold 30. This third hollow region 16 has two arms 66, which are connected to the first hollow region 12, or the second hollow region 14, via a through-opening 28. The third hollow region 16 defines the sprue and runner system. In the case of the parts 116, 118 produced by the first mold 10', represented in FIG. 25, the injection points respectively lie on the rear side (with respect to the finished toothbrush 50) of the two plastic parts 116, 118 in the lower end region of the handle region 56.

In the first injection-molding cycle, shown in FIGS. 25 and 26, the slide 34 is in the upper end position. In the first injection-molding cycle, a first component 38, comprising liquid polymer material, is injected via the first injection point 24 into the third hollow region 16 and via the arms 66 respectively into the first and second hollow regions 12, 14. Therefore, the first part 116 and the second part 118 are simultaneously injection-molded in a single injection-molding operation. In this case, the two parts 116, 118 of the toothbrush 50 consist of the same polymer, preferably a hard component of one color or colorless.

It is also possible to feed each hollow region 12, 14 via a respective gate of its own. In this case, the two parts 116, 118 may be produced from different polymers of the same color or different colors, or from the same polymer of different colors.

In a subsequent method step, the second part-mold 32 is removed from the first part-mold 30, whereby the sprue and runner system of solidified material 22 is exposed and is removed in a way similar to the method previously mentioned.

In a further method step, the slide 34 is brought into the lower end position, so that the wall surface 12a is displaced from the first separating plane F1 in such a way in the direction of arrow P that that it comes to lie in the second separating plane F2, which is substantially flush with the wall surface 14b of the index plate 108. Consequently, the slide 34 brings the first part 116 with the tongue body 88 into a second position for a second injection-molding cycle, in which the first part 116 with the tongue body 88 must be located within the second part 118 (the toothbrush frame).

The first part-mold 30 with the second part-mold 32 is subsequently removed from the slide 34 and the index plate 108, the two finished parts 116, 118 being held in a front region of the index plate 108. After that, the index plate 108 and the slide 34 inserted into it are together rotated away about an axis of rotation D—in a way similar to the tool shown in FIG. 8. As a result, the first part 116, pushed into the second part 118, is moved into a further hollow region, or a new, further part-mold 46 (not shown). The movement is initiated by the index plate 108. During this rotational movement, the two parts 116, 118 are held in a front region of the index plate 108.

In the second injection-molding cycle, the first part 116 (having the tongue body 88) is connected to the second part 118 (forming the toothbrush frame), displaced in one another, in that, in the state in which they are pushed one into the other, they are encapsulated in an enveloping manner, or partially encapsulated in an enveloping manner, preferably only in the handle region 56 with a plastic of a second (or third) component 39. With preference, the encapsulation takes place in this case with a soft component.

After the shaping, the periphery 52a of the second part 118 and the toothbrush tongue 88 of the first part 116 are provided with bristles by generally known methods described above, after which the production process of the toothbrush 50 is complete.

The three parts, or the first two parts 116, 118 and the encapsulation, can therefore consequently be produced from three different components 38, 38', 39. That is to say that a combination of hard and/or soft components can be realized. For example, the first two parts 116, 118 may be produced from a hard component, while the encapsulation takes place with a soft component. By variation of the components and the type of injection (separate gates or sprue and runner system), it is also possible for a wide variety of color combinations to be realized.

It is of course also possible to provide further regions of the toothbrush 50 with soft material or form them with it, as is generally known.

It is also conceivable for the neck region 54 to be encapsulated with the second component 39, in an embodiment not shown. This results in a smaller deflection in comparison with the embodiment above.

However, it is also conceivable for the fastening region 98 to extend from the first part 116 and the corresponding clearance 90 in the second part 118 to extend only over part of the handle region 56, for example only over half or only over a third, of the length of the handle region 56 (seen from the front end region, adjoining the neck region 54).

The invention claimed is:

1. A method for producing a toothbrush with a body, which comprises at least a handle region, a neck region and a head region, by the two-component or multi-component injection-molding process, the body consisting at least partially of at least a first and a second component and the first component having at least one segment, which is separated from other regions of the first component, with the following steps:
    providing a first mold, with first hollow regions, which correspond to the other regions of the body to be produced from the first component and to which the first component can be supplied, with second hollow regions, which correspond to the at least one segment to be produced from the first component and which are completely separated from the first hollow regions and also with at least one third hollow region, to which the first component can be supplied and which is in connection with the second hollow regions in such a way that material supplied to the third hollow region is supplied to the second hollow regions;
    providing a second mold, with fourth hollow regions, which are located at least in the region around the at least one segment;
    injection-molding the other regions of the body by supplying the first component to the first hollow regions;
    injection-molding the at least one segment in the second hollow regions by supplying the first component to the third hollow region;
    removing the solidified material remaining behind in the third hollow region;
    changing the mold;
    injection-molding connecting elements between the at least one segment and/or the other regions of the body by supplying the second component to the second mold.

2. The method as claimed in claim 1, wherein the first component is a hard component and the second component is a hard or a soft component.

3. The method as claimed in claim 2, wherein the hard component consists of styrene-acrylonitrile (SAN), polyethylene terephthalate (PET), polyethylene (PE), polymethylmethacrylate (PMMA), acrylobutadiene styrene (ABS) or polypropylene (PP).

4. The method as claimed in claim 2, wherein the soft component consists of a rubber-elastic material.

5. The method as claimed in claim 4, wherein the rubber-elastic material is a thermoplastic elastomer (TPE).

6. The method as claimed in claim 5, wherein thermoplastic elastomer (TPE) is polyurethane (PU).

7. The method as claimed in claim 1, wherein the spatial position of the segments is changed at least one of in relation to one another or in relation to the other regions of the body, by at least one of translation or rotation, before the injection-molding of the second component.

8. The method as claimed in claim 1, wherein a plurality of segments are provided in the head region, bristle clusters being inserted into the first mold before the injection-molding of the first component and, during the production of the segments, being fixed by the latter by encapsulation or, during the injection-molding of the second component, being fixed by the latter in or on the segments or, after the injection-molding of the first and the second components, being fixed in the segments.

9. The method as claimed in claim 1, wherein the first mold is formed by at least three part-molds, the first and second hollow regions being formed between a first and a second part-mold and the third hollow region being formed between the second part-mold and a third part-mold.

10. The method as claimed in claim 9, wherein the second and third part-molds are together moved away from the first part-mold to remove the solidified material remaining behind in the third hollow region.

11. The method as claimed in claim 9, wherein, to change the mold, the first part-mold is joined together with a further part-mold, together with which it forms the second mold.

12. The method as claimed in claim 1, wherein a number of segments that are separate from one another are produced, in that the first mold has a number of second hollow regions kept at a distance from one another.

13. The method as claimed in claim 12, wherein bristles are attached to at least one of the at least one segment or the other regions, by one of conventional tufting, an Anchor Free Tufting (AFT) method or an In Mold Tufting (IMT) method.

14. The method as claimed in claim 12, wherein the at least one segment, the other regions and the connecting elements are shaped in such a way as to form a carrier element for at least one of bristles or other cleaning elements, which is connected by welding to a separately produced body.

15. The method as claimed in claim 14, wherein the connecting elements are formed as a membrane, in which the at least one segment is embedded, and wherein the other regions are formed at the periphery of the membrane, completely or partially enclosing the latter.

16. The method as claimed in claim 15, wherein the carrier element is provided with bristles by an Anchor Free Tufting method or by conventional tufting, and wherein the carrier element provided with bristles is connected to the separately produced body, in that at least the other regions are at least partially connected by welding to the body.

17. A device for carrying out the method as claimed in claim 1, comprising:
    a first mold, with first hollow regions, which correspond to the other regions of the body to be produced from the first component and to which the first component can be supplied, with second hollow regions, which are completely separated from the first hollow regions and correspond to the segments to be produced from the first component, and also with at least one third hollow region, to which the first component can be supplied and which is in connection with the second hollow regions in such a way that material supplied to the third hollow region is supplied to the second hollow regions;

a second mold, with a fourth hollow region, which is larger than the second hollow region, at least in the region around the segments;

means for removing the first mold at least partially in such a way that the third hollow region, including solidified material remaining behind in it, is removed from the segments and the other regions of the toothbrush.

18. The device as claimed in claim 17, having means for introducing the segments and the other regions of the toothbrush into the second mold.

19. The device as claimed in claim 17, wherein the second hollow regions for producing a plurality of segments that are separate from one another comprise a plurality of subregions, which are in connection with one another exclusively via the third hollow region.

20. The device as claimed in claim 19, wherein the first mold is shaped in such a way as to form in the head region a plurality of segments which are suitable for securing at least one of bristle clusters, other cleaning elements, or massaging elements.

21. The device as claimed in claim 20, wherein the second mold is shaped such that it is adapted to the first mold in such a way that connecting elements are formed from the second component as a membrane, in which the segments are at least partially embedded and which is resiliently connected to the other regions of the first component.

22. The device as claimed in claim 20, wherein the second hollow region is shaped in such a way that the segments have the form of sleeves that are open at two ends, through which bristles are led, the opening directions being oriented substantially perpendicularly in relation to the surface area of the head region.

23. The device as claimed in claim 17, wherein the first mold comprises at least three part-molds, the first and second hollow regions being formed between a first and a second part-mold and the third hollow region being formed between the second part-mold and a third part-mold.

24. The device as claimed in claim 23, wherein the second mold comprises at least two part-molds, one of the part-molds being the first part-mold.

25. The device as claimed in claim 17, having a handling unit for changing at least one of the position or orientation of the segments in relation to one another before the second component is injected.

26. The device as claimed in claim 17, wherein the second hollow regions are kept at a distance from one another.

27. The method as claimed in claim 1, wherein the second hollow regions are kept at a distance from one another.

28. A method for producing a toothbrush with a body which comprises at least a handle region, a neck region and a head region by the two-component or multi-component injection-molding process, the body consisting at least partially of a first and a second component and having segments which are separated from other regions of the body, with the following steps:

providing a first mold with first hollow regions, which correspond to the segments to be produced by the first component, and also with a second hollow region, to which the first component can be supplied and which is in connection with the first hollow region in such a way that material supplied to the second hollow region is supplied also to the first hollow region;

providing a second mold with third hollow regions, which are located at least in the region around the segments;

injection-molding the segments in the first hollow regions by supplying the first component to the second hollow region;

removing the solidified material remaining behind in the second hollow region;

changing the mold; and injection-molding connecting elements between the segments or the other regions of the body by supplying the second component to the second mold, wherein the first hollow regions of the first mold and the third regions of the second mold are completely separated from each other.

29. The method as claimed in claim 28, wherein the spatial position of the segments in relation to one another and/or in relation to the other regions of the body is changed, in particular by translation and/or rotation, before the injection-molding of the second component.

30. The method as claimed in claim 28, wherein a plurality of segments are provided in the head region, bristle clusters being inserted into the first mold before the injection molding of the first component and, during the production of the segments, being fixed by the latter by encapsulation or, during the injection-molding of the second component, being fixed by the latter in or on the segments or, after the injection-molding of the first and the second components, being fixed in the segments.

31. A method for producing a toothbrush with a body which comprises at least a handle region, a neck region, a head region and a carrier element connected to the head region and produced by the two-component or multi-component injection-molding process, the carrier element consisting at least partially of a first and a second component and having segments which are separated from other regions with the following steps:

providing a first mold with first hollow regions, which correspond to the segments to be produced by the first component kept at a distance from the other regions and also with a second hollow region, to which the first component can be supplied and which is in connection with the first hollow regions in such a way that material supplied to the second hollow region is supplied also to the first hollow regions;

providing a second mold with third hollow regions, which are located at least in the region around the segments;

injection-molding the segments in the first hollow regions by supplying the first component to the second hollow region;

removing the solidified material remaining behind in the second hollow region;

changing the mold;

injection-molding connecting elements between the segments or the other regions of the body by supplying the second component to the second mold; and at least partially connecting the carrier element to the body, wherein the first hollow regions of the first mold and the third regions of the second mold are completely separated from each other.

* * * * *